US012780205B1

(12) United States Patent
Koli

(10) Patent No.: US 12,780,205 B1
(45) Date of Patent: Nov. 3, 2026

(54) WHEEL-HOP ESTIMATION AND CONTROL

(71) Applicant: Dana Heavy Vehicle Systems Group, LLC, Maumee, OH (US)

(72) Inventor: Rohit Koli, Toledo, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 19/195,151

(22) Filed: Apr. 30, 2025

(51) Int. Cl.

| | |
|---|---|
| ***B60W 30/18*** | (2012.01) |
| ***B60W 10/02*** | (2006.01) |
| ***B60W 10/08*** | (2006.01) |
| ***B60W 10/11*** | (2012.01) |
| ***B60W 10/184*** | (2012.01) |

(52) U.S. Cl.
CPC ...... *B60W 30/18127* (2013.01); *B60W 10/02* (2013.01); *B60W 10/08* (2013.01); *B60W 10/11* (2013.01); *B60W 10/184* (2013.01); *B60W 30/18172* (2013.01); *B60W 2510/081* (2013.01); *B60W 2540/10* (2013.01); *B60W 2540/12* (2013.01); *B60W 2710/022* (2013.01)

(58) Field of Classification Search
None
See application file for complete search history.

(56) References Cited

U.S. PATENT DOCUMENTS

| | | | | |
|---|---|---|---|---|
| 5,897,130 | A | 4/1999 | Majeed et al. | |
| 9,738,286 | B1 | 8/2017 | Trent et al. | |
| 2011/0172889 | A1* | 7/2011 | Zhang | B60W 30/20 701/54 |
| 2012/0241275 | A1* | 9/2012 | Simon | F16D 13/04 192/35 |
| 2017/0356507 | A1* | 12/2017 | Trent | F16D 41/16 |
| 2024/0053167 | A1 | 2/2024 | Karavas | |
| 2024/0174080 | A1* | 5/2024 | Jutkowitz | B60K 17/34 |
| 2024/0391313 | A1* | 11/2024 | Van Der Knaap | B60K 15/07 |

* cited by examiner

*Primary Examiner* — Hitesh Patel
*Assistant Examiner* — Elle Rose Knudson
(74) *Attorney, Agent, or Firm* — McCoy Russell LLP

(57) ABSTRACT

Systems and methods are disclosed for controlling an oscillation of a suspension and driveline of a vehicle with multi-speed suspended axles during "wheel-hop" conditions. Preparatory actions for an impending wheel-hop may be performed that may reduce the negative effects on the suspension and driveline. The proposed systems may include an estimator component that detects the occurrence of wheel-hop; a tuning controller that calibrates a response time and robustness of the estimator based on a driving scenario; a protection controller that activates a clutch to a neutral position to disconnect a traction motor of the vehicle from the driveline; and a pre-protection controller that facilitates the protective action performed by the protection controller by identifying specific scenarios under which the clutch can be offset from a fully engaged position and moved closer to the neutral position in anticipation of the protective action.

17 Claims, 23 Drawing Sheets

WHEEL-HOP ESTIMATION AND CONTROL

TECHNICAL FIELD

The present description relates generally to methods and systems for controlling a braking of a vehicle, specifically a vehicle with multi-speed suspended axles with dog clutches.

BACKGROUND AND SUMMARY

A vehicle, such as a light or heavy duty truck, may have a suspended multispeed electric axle. Suspended multispeed electric axles have a propensity to have reduced traction under a specific direction of torque, subject to the kinetics and dynamics of the suspension. On suspended e-axles where the traction is reduced when braking in a forward direction, there is a potential for the tires to lose traction entirely. When this loss of traction occurs, wheels may lift off the ground, resulting in rapid deceleration of the wheels caused by the braking torque applied. Due to the nature of the suspension system, the wheels eventually drop down and make sufficient contact with the road, thereby increasing the traction. This may cause a high longitudinal force at a wheel contact patch of the road, resulting in a high impulse torque at the wheels. This high impulse torque opposes the braking torque, and causes rapid acceleration of the driveline. This stick-slip behavior, often referred to as “wheel-hop”, triggers a mode of oscillation in the suspension and driveline of the e-axle system. The oscillation may be difficult to control, and can cause high inertial torque on components of the driveline. In some cases, the high inertial torque caused by the wheel-hop may cause permit mechanical damage to internal driveline components.

In one example, the issues described above may be addressed at least partly by a method for a vehicle including a suspended multi-speed e-axle, the method comprising estimating an intensity of a wheel-hop condition of the vehicle based on oscillations in a motor speed of an electric motor of the e-axle; detecting that the estimated wheel-hop intensity (EWHI) is greater than a threshold intensity, and in response, actuating a dog clutch of a transmission of the e-axle into a neutral position to disconnect the electric motor from an output of the transmission.

It should be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
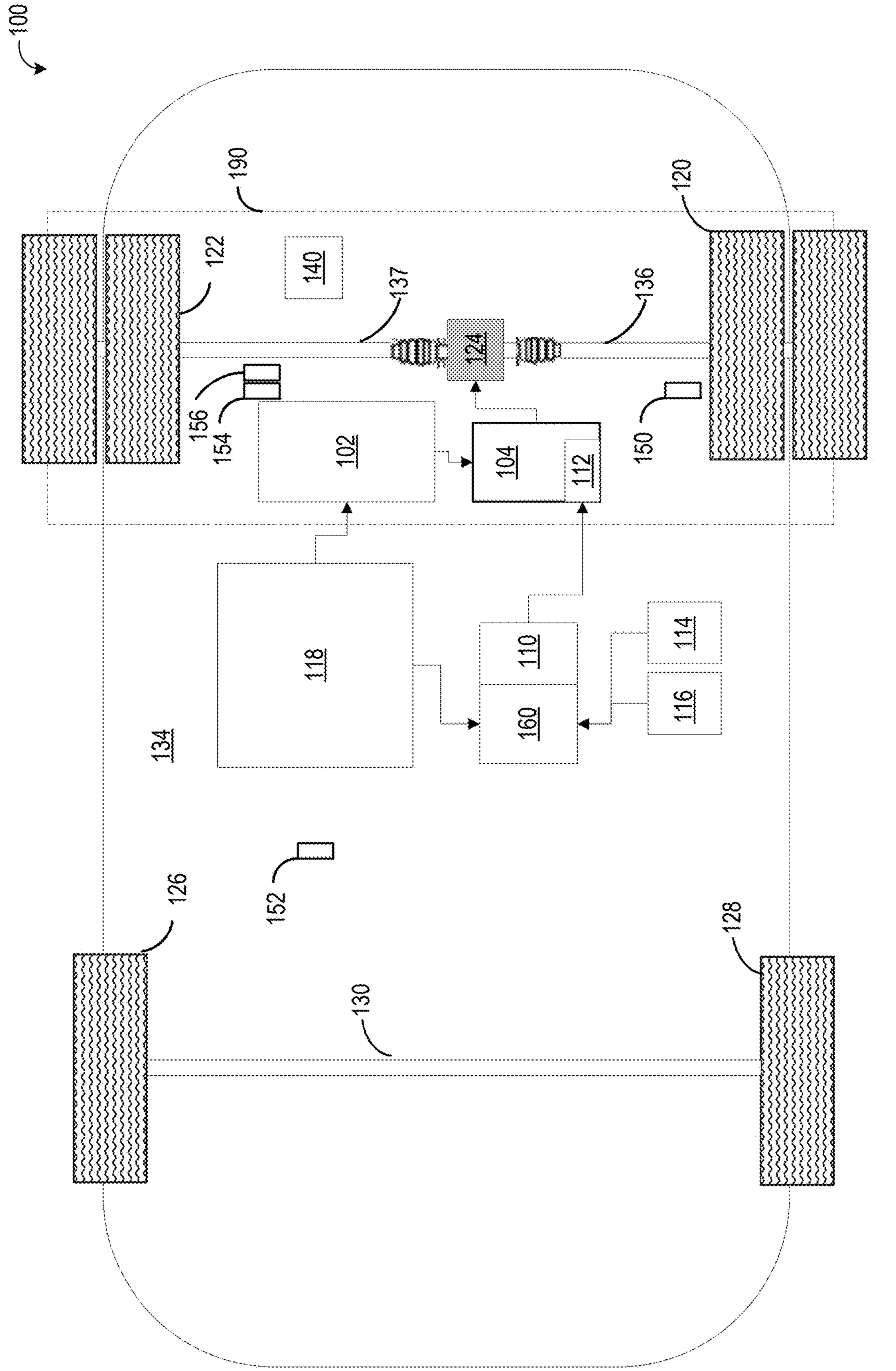
FIG. 1 shows an example vehicle including a suspended e-axle.

The following description relates to controlling a braking of a vehicle with a multi-speed suspended axle, under conditions in which wheel-hop may occur. Wheel-hop conditions occur when one or more wheels of the vehicle lift off the road due to loss of traction, resulting in rapid deceleration of the wheels, followed by rapid acceleration of the driveline once the wheels make contact with the road. The wheel-hop creates an oscillation in the suspension and driveline of the e-axle system between a braking torque applied to wheels of the vehicle under conditions when the wheels lift off the road, and an impulse torque generated in an opposite direction when the wheels drop and make contact with the road.

Conventionally, wheel-hop on commercial vehicles may be controlled externally by a dedicated brake controller that interrupts the friction and regenerative braking of the axle.

A more effective solution would be to actuate a true-neutral condition on the axle. However, the external brake controller may not be directly capable of actuating the true-neutral condition, and would likely need the assistance of a vehicle control unit (VCU) to send a neutral command to a transmission control unit (TCU). The choice of clutch on which to actuate the true-neutral condition would typically be controlled by the VCU. Another disadvantage of the dedicated brake controller is that a true-neutral condition triggered by an external VCU/brake controller may suffer from controller area network (CAN) delays, resulting in delayed decision and control actuation. As a result, the oscillation of the suspension and driveline may not be sufficiently controlled or mitigated.

To address this issue, alternative systems and methods for controlling the wheel-hop are disclosed herein, which execute primarily on the TCU. Preparatory actions for an impending wheel-hop may be performed in accordance with the disclosed systems and methods that may reduce the negative effects on the suspension and driveline. Specifically, the TCU may actuate the true-neutral condition on a clutch of the vehicle having a least amount of torque, thereby increasing a probability and a speed of the actuation of the true-neutral condition. The alternative systems described herein comprise an estimator component that detects the occurrence of a wheel-hop condition and estimates an intensity of the wheel-hop condition; a tuning controller of the estimator, which calibrates a response time and robustness of the estimator, based on a driving scenario; a protection controller, which may activate the clutch to a neutral position to disconnect a traction motor of the vehicle from an output of a transmission of the e-axle (e.g., thereby achieving the true-neutral condition); and a pre-protection controller, which may facilitate the protective action performed by the protection controller by identifying specific scenarios under which the clutch can be offset from a fully engaged position, and moved closer to the neutral position, in anticipation of the protective action. In this way, the oscillation of the suspension and driveline caused by the wheel-hop may be reduced or eliminated, thereby increasing the useful lives of components of the driveline, reducing a noise, vibration, and harshness (NVH) generated by the wheel-hop, and increasing a safety of the vehicle.

Referring now to FIG. 1, an example vehicle 100 is shown. In some examples, vehicle 100 may be a hybrid vehicle with multiple sources of torque available to one or more wheels. In other examples, vehicle 100 is an electric vehicle with an electric motor(s) and not including an internal combustion engine. Vehicle 100 is provided as an example of a system including a suspended e-axle 190 as described herein. However, vehicle 100 is not intended to be limiting and in some examples the suspended e-axle 190 may be included in vehicles having a different configuration (e.g., a different number and/or relative configuration of wheels and/or other components). For example, the vehicle 100 may be a truck including various axles.

In the depicted example, the e-axle 190 is suspended from a chassis 134 of the vehicle via a suspension 140. The e-axle 190 includes an electric motor 102, a transmission 104, and a differential gear assembly 124. The electric motor 102 generates torque in one or more drive wheels 120,122 via the transmission 104 when one or more clutches of transmission 104 are engaged. The transmission 104 may include an output shaft such as a countershaft rotatably coupled to an input of the differential gear assembly 124, which may power one or more of a first drive wheel 120 and a second drive wheel 122 via drive axle shafts 136 and 137, respectively. In other embodiments, the output shaft may be coaxially aligned with an input shaft of the transmission 104, and a countershaft may be used to provide torque applied to the input shaft to the output shaft via a gear assembly of the transmission. In still other embodiments, electric motor 102, transmission 104, and the input shaft and output shaft may be aligned perpendicular to the axle shafts 136 and 137, whereby the transfer of torque from the output shaft to a drive wheel or drive axle is accomplished via the differential gear assembly 124, or in a different configuration.

In some examples, the torque may be applied to only one drive wheel, or the torque applied to the first drive wheel 120 and the second drive wheel 122 by the differential gear assembly 124 may be different (for example, during cornering of the vehicle or operation on an uneven ground surface), and in some conditions it may be approximately the same (for example, while driving the vehicle straight on a level ground surface, without cornering). The vehicle 100 may also include one or more free wheels, such as free wheels 126 and 128 mounted on free axle 130. The free wheels may rotate as the vehicle is driven without being directly propelled by the engine or electric motor (e.g., the engine and electric motor do not apply torque directly to the axle coupled to the free wheels). In other embodiments, additional free wheels may be included on free axle 130, and/or additional free axles may be included in vehicle 100, each of which may include a plurality of wheels. For example, heavy trucks or buses may have additional front and/or rear axles to distribute the weight of cargo, and each axle may include two wheels on each side.

As shown in the illustrated example, the first drive wheel and the second drive wheel may be rear wheels. In other embodiments, the first drive wheel and the second drive wheel may be front wheels, and the rear wheels may be free wheels, or a transfer case (not depicted in FIG. 1) may be used to power all the wheels on vehicle 100, for example, in the case of 4-wheel drive vehicles or all-wheel-drive vehicles. The position or number of drive wheels on vehicle 100 should not be construed as limiting the scope of this disclosure.

In an embodiment, the transmission 104 may be an automated manual transmission, whereby shifting is handled automatically by a transmission control unit (TCU) 110. Further, the transmission may be adjustable between various modes of operation via the TCU 110. For example, an operator of the vehicle (e.g., a driver) may adjust the transmission between a manual mode in which gear selection is performed by the operator via an input device (e.g., a shift lever) and an automated mode in which the gear selection is automatically determined by the controller based on vehicle operating conditions (e.g., engine speed, vehicle speed, wheel torque, etc.). The transmission 104 is described in further detail below in reference to FIGS. 2-5.

For automatic shifting, the TCU 110 may be communicatively coupled to a shift assembly 112 that engages gears of the transmission 104. The shift assembly 112 may include actuator sensors from which the TCU 110 may receive data used to control operation of the shift assembly (e.g., to adjust a selected gear of the transmission). The TCU 110 may also receive input from other sensors of vehicle 100, such as one more wheel sensors 150, an accelerator pedal position sensor 152, a motor speed sensor 154, a motor torque sensor 156, as well as temperature sensors, pressure sensors, throttle sensors, battery charge sensors, air-fuel ratio sensors, etc. The TCU 110 may send control signals to various actuators communicatively coupled to electric motor 102 and/or vehicle 100. The various actuators may include motors of the shift assembly 112 that engage the gears of transmission 104 by sliding synchronizer rings and cone clutches along the transmission output shaft, via shift forks that slide along a selector shaft (not depicted in FIG. 1). The various actuators may also include, for example, various valves, throttles, fuel injectors, etc. The types of sensors and actuators listed herein are for illustrative purposes and any type of sensors and/or actuators may be included without departing from the scope of this disclosure.

The electric motor 102 may be powered by a battery pack 118. Battery pack 118 may be an energy storage device configured to deliver electrical power to various components of the electrical system of the vehicle 100 including supplying current to electric motor 102 coupled to drive wheels 120 and 122 and/or other powered wheels of the vehicle 100. The battery pack 118 may be electrically coupled with the electric motor 102 and/or an electronic controller 160. The electronic controller 160 may regulate the power supply provided by the battery pack 118 to the electric motor 102 in order to increase or decrease the speed of the vehicle 100. The electronic controller 160 may also be communicatively coupled to the TCU 110.

In the case of hybrid vehicles, vehicle 100 may include both an internal combustion engine and an electric motor, which may be positioned on the chassis 134 in a variety of configurations. For example, an internal combustion engine may be positioned at the location of electric motor 102, and electric motor 102 may be positioned at another location on the chassis 134.

The depicted connections between electric motor 102, transmission 104, and drive wheels 120,122 and/or 122 indicate transmission of mechanical energy from one component to another, whereas the connections between the electric motor 102 and the battery pack 118 may indicate transmission of a variety of energy forms such as electrical, mechanical, etc. For example, torque may be transmitted from the electric motor 102 to drive the drive wheels 120,122 and/or 122 via the transmission 104. Additionally, the electric motor 102 may be configured to operate in a generator mode and/or a motor mode. In a generator mode, the output received by the electric motor 102 may be used to charge the battery pack 118, which reduces the amount of drive output delivered to the drive wheels 120,122 and/or 122, or the amount of braking torque to the drive wheels 120,122 and/or 122. Operations of the vehicle 100 that use the generator mode may be employed, for example, to achieve energy efficiency gains through regenerative braking, increased engine efficiency (if included), etc. In the motor mode, the electric motor 102 may supply mechanical output to the transmission 104 and the drive wheels 120,122 and/or 122, for example by using electrical energy stored in the battery pack 118.

The electric motor 102 may also be used to deliver electrical energy to external, auxiliary devices during power take-off. The electric motor 102 may run during power take-off when the drive wheels 120,122 and/or 122 are not in motion, allowing power output from the electric motor 102 to be directed at least partially towards operating the auxiliary devices.

The electronic controller 160 and the TCU 110 may each be a microcomputer, which may include a microprocessor unit, input/output ports, and an electronic storage medium for executable programs and calibration values. The electronic controller 160 and the TCU 110 may include non-transitory computer readable medium (memory) in which programming instructions are stored, and may be programmed with computer readable data representing instructions executable to perform the methods described below, as well as other variants that are anticipated but not specifically listed. Memory as referenced herein may include volatile and non-volatile or removable and non-removable media for a storage of electronic-formatted information such as computer readable instructions or modules of computer readable instructions, data, etc. Examples of computer memory may include, but are not limited to RAM, ROM, EEPROM, flash memory, or any other medium which can be used to store the desired electronic format of information and which can be accessed by the processor or processors or at least a portion of a computing device. The electronic controller 160 may be electrically coupled to a battery 114 and a starter 116, which may be used to start the engine and/or provide initial power to the controller 160 and the TCU 110.

The TCU 110 may control components of the transmission 104. In particular, as described in greater detail below, the TCU may control components of the transmission 104 to predict an intensity of a wheel-hop condition of drive wheels 120 and/or 122 before the wheel-hop condition fully develops, and perform preparatory actions via the transmission 104 to reduce negative effects of the wheel-hop condition. For such purpose, the TCU 110 receives signals from various sensors of vehicle 100 and employs the various actuators of vehicle 100 to adjust vehicle operation based on the received signals and instructions stored in non-transitory memory of the TCU 110. TCU 110 is configured to receive various signals from sensors coupled to the transmission 104 and send command signals to actuators of components of the vehicle 10, such as the electric motor 102, transmission 104, etc. Additionally, the TCU 110 may be configured to receive an accelerator pedal position (APP) of an accelerator pedal of vehicle 100 actuated by a user of vehicle 100. The APP may be estimated by and received from the APP sensor 152. In one example, the TCU 110 may receive a pedal position signal and adjust actuators of the electric motor 102 based on the pedal position signal to vary the rotational output of the electric motor 102, and/or TCU 110 may receive the pedal position signal and adjust actuators of the transmission 104 based on the pedal position signal to vary the rotational output of the drive wheels 120,122 and/or 122. The sensors communicating with the TCU 110 may include an electric machine sensor, such as a resolver or Hall effect sensor for sensing a rotor position of the electric machine (e.g., motor speed sensor 154), and wheel speed sensor 150, accelerometer, etc. An effect of the wheel-hop condition is depicted in FIG. 2.

Figure 2:
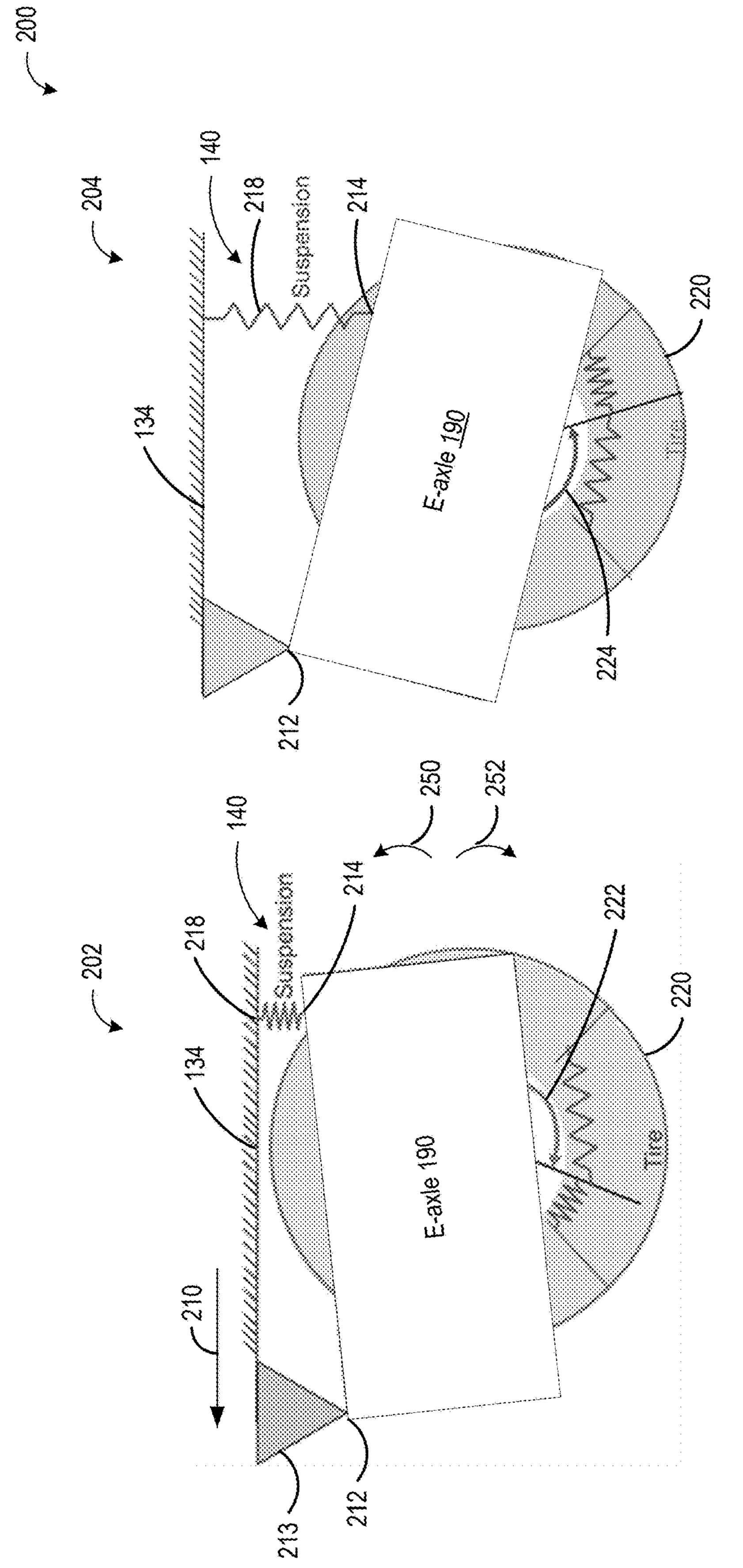
FIG. 2 is a diagram showing orientations of the suspended e-axle during a braking of the vehicle.

Turning now to FIG. 2, a diagram 200 shows the e-axle 190 suspended from the chassis 134 of the vehicle 100 of FIG. 1. A front of the vehicle is indicated by an arrow 210. A first point 212 of the e-axle 190 may be rotationally coupled to a support 213 of the chassis 134 (e.g., towards the front of the vehicle), and a second point 214 of the e-axle 190 may be coupled to the suspension 140 of the vehicle (e.g., towards the back of the vehicle). For example, the suspension 140 may include a spring 218, where the second point 214 of the e-axle 190 may be coupled to a first end of the spring 218, and a second end of the spring 218 may be coupled to the chassis 134. The e-axle 190 may be coupled to a wheel 220. In other embodiments, a spring may not be used, and the suspension 140 may be provided by different components.

Diagram 200 shows the e-axle 190 in a first suspended state 202, and a second suspended state 204. Diagram 200 illustrates a pitching motion of e-axle 190 caused by a torque applied by motor 102 on wheel 220. The first suspended state 202 may correspond to a scenario where reverse traction is applied, while the vehicle is being operated in a reverse direction, or when regenerative braking is used when operating in a forward direction. As a result of the reverse traction or the forward regenerative braking, e-axle 190 may rotate upward towards the chassis 134 in a direction indicated by an arrow 250, with first point 212 acting as a fulcrum. In the first suspended state 202, the suspension 140 may be in a compressed state, and e-axle 190 may be angled upward with respect to the first point 212 and the chassis 134. As a result of being angled upward with respect to the chassis 134, a rotational force 222 may be generated on e-axle 190, which may cause the e-axle 190 to subsequently rotate downward in an opposite direction indicated by an arrow 252. As a result, an oscillation of e-axle 190 may be generated that may cause wheel-hop to occur.

The second suspended state 204 may correspond to a scenario where forward traction is applied, while the vehicle is being operated in a forward direction, or when regenerative braking is used when operating in the reverse direction. As a result of the forward traction or the reverse regenerative braking, e-axle 190 may rotate downward away from the chassis 134 in a direction indicated by the arrow 252, with first point 212 acting as a fulcrum. In the second suspended state 204, the suspension 140 may be in an expanded state, and e-axle 190 may be angled downward with respect to the first point 212 and the chassis 134. As a result of being angled downward with respect to the chassis 134, a rotational force 224 may be generated on e-axle 190, which may cause the e-axle 190 to subsequently rotate upward in an opposite direction indicated by the arrow 250. As a result, the oscillation of e-axle 190 may be generated that may also cause may cause the wheel-hop to occur. When the wheel-hop occurs, damage may be caused to components of the e-axle 190, such as the components described below in reference to FIG. 3.

Figure 3:
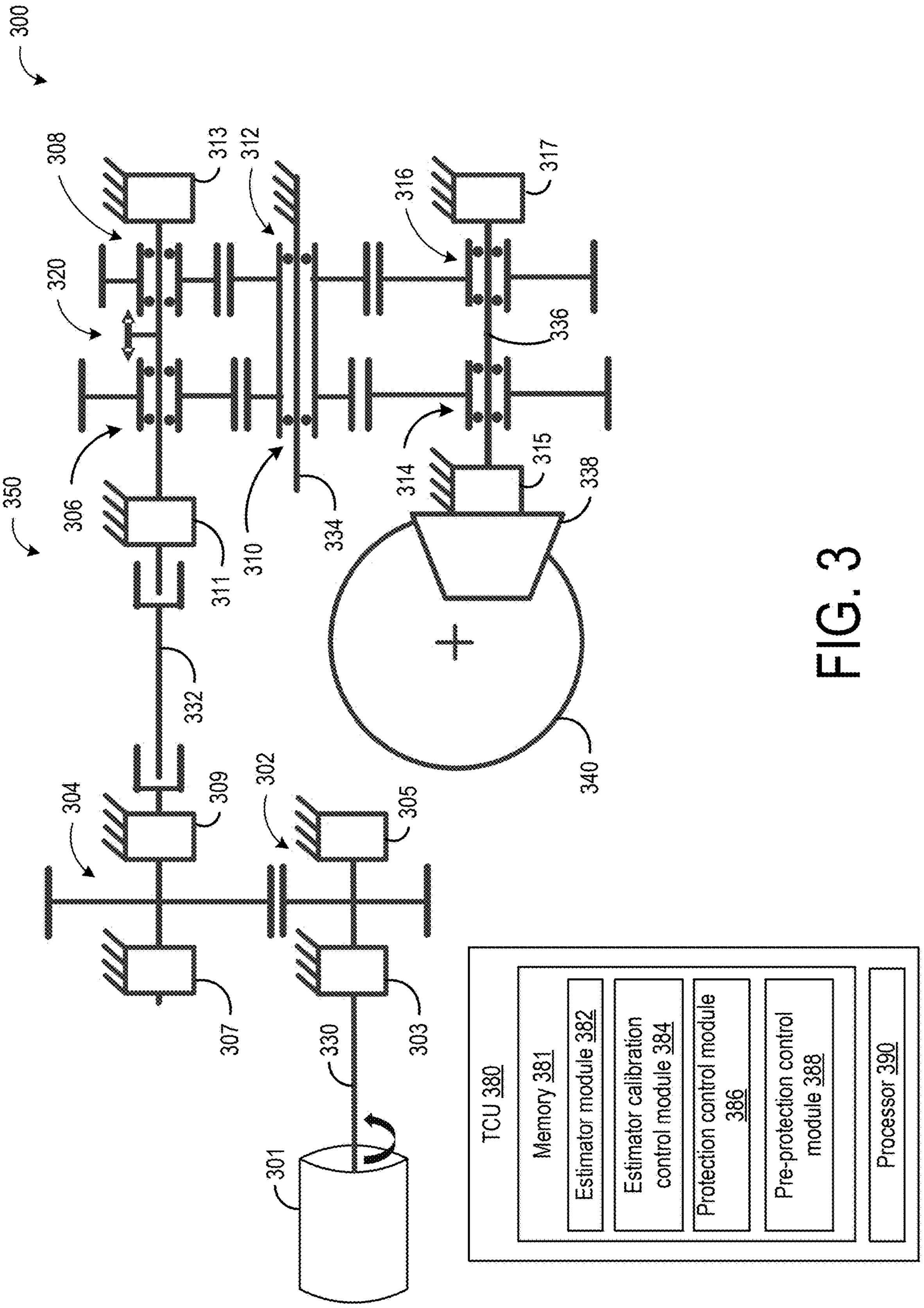
FIG. 3 is a schematic diagram showing an exemplary e-axle.

FIG. 3 shows a schematic diagram of an exemplary e-axle 300 of a vehicle, which may be a non-limiting example of the e-axle 190 of vehicle 100 of FIG. 1. In the depicted example, the e-axle 300 comprises a transmission 350 (e.g., transmission 104) including plurality of gears, including a first gear 302, a second gear 304, a third gear 306, a fourth gear 308, a fifth gear 310, a sixth gear 312, a seventh gear 314, and an eighth gear 316. In other examples, the transmission 350 may include a different number or configuration of gears. The gears 302, 304, 306, 308, 310, 312, 314, and 316 of the transmission 350 may be coupled to various shafts of the transmission 350, and the gears 302, 304, 306, 308, 310, 312, 314, and 316 may be supported on the various shafts by respective bearings. Specifically, the first gear 302 may be coupled to an input shaft 330 of the transmission 350, and may be supported by a first bearing 303 and a second bearing 305; the second gear 304 may be coupled to one or more intermediate and upper shafts 332 of the transmission 350, and may be supported by a third bearing 307 and a fourth bearing 309; the third gear 306 and the fourth gear 308 may be coupled to the one or more intermediate and upper shafts 332 of the transmission 350, and may be supported by a fifth bearing 311 and a sixth bearing 313; the fifth gear 310 and the sixth gear 312 may be coupled to a layshaft (or idler shaft) 334 of the transmission 350; and the seventh gear 314 and the eighth gear 316 may be coupled to an output shaft 336 of the transmission 350, and may be supported by a seventh bearing 315 and an eighth bearing 317. The output shaft 336 may be coupled to a wheel hub assembly 338 of a wheel 340 of the e-axle 190.

The transmission 350 may receive an initial torque from an electric motor 301 (e.g., electric motor 102) of the e-axle 300 via the input shaft 330. The initial torque may be channeled through the gears 302-316 via various torque paths, to generate an output torque at the wheel hub assembly 338 and wheel 340. The output torque may generate a propulsion of the vehicle.

As an example, in a first scenario where the vehicle is operating in first gear, a first torque path through e-axle 300 may run through the first gear 302, the second gear 304, the third gear 306, the fourth gear 308, the sixth gear 312, the fifth gear 310, and the seventh gear 314 to generate the output torque at wheel 340. In a second scenario where the vehicle is operating in second gear, a second torque path through e-axle 300 may run through the first gear 302, the second gear 304, the third gear 306, the fifth gear 310, and the seventh gear 314 to generate the output torque at wheel 340. In a third scenario where the vehicle is operating in third gear, a third torque path through e-axle 300 may run through the first gear 302, the second gear 304, the third gear 306, the fifth gear 310, the sixth gear 312, the eighth gear 316, and the seventh gear 314 to generate the output torque at wheel 340. The various torque paths may be controlled by an operator of the vehicle or based on operating conditions of the vehicle, via an actuation of clutches of the vehicle. The actuation of the clutches may be performed by a TCU 380 of the e-axle 300, which may be a non-limiting example of the TCU 110 of FIG. 1.

As described in greater detail below, to prevent damage to any of the gears 302, 304, 306, 308, 310, 312, 314, and 316, bearings 303, 305, 307, 309, 311, 313, 315, and 317, the clutches, and/or other components of the transmission 350 when the wheel-hop condition described above occurs, the TCU 380 may predict an intensity of a developing wheel-hop condition. If the predicted intensity is greater than a threshold intensity, a protection control routine may be executed at the transmission 350 to reduce or eliminate the effects of the wheel-hop condition. The protection control routine may include actuating a selected clutch of the transmission 350 to a neutral position, thereby disconnecting the electric motor 301 from the output shaft 336. In various examples, the selected clutch is a clutch having a least amount of torque of the transmission. For example, in the example depicted in FIG. 3, the clutch having the least amount of torque may be a clutch 320, which may selectively engage the third gear 306 or the fourth gear 308. The clutch 320 may be a dog clutch. In other examples, the clutch having the least amount of torque may be a different clutch, and/or the selected clutch may be a different clutch.

The TCU 380 may include a memory 381 that stores various software modules to predict the probability of the wheel-hop, and take preventative action to reduce, eliminate, and/or mitigate the effects of the wheel-hop. Instructions stored in the various software modules may be executed by a processor 390 of the TCU 380. In one embodiment, the memory 381 may include an estimator module 382, which may include instructions for estimating the intensity of the wheel-hop condition, based on a motor speed of the electric motor 301. The memory 381 may include an estimator calibration control module 384, which may include instructions for calibrating the estimator module 382 as a function of a brake switch, a motor torque, and an internally calibrated regeneration torque threshold. The memory 381 may include a protection control module 386, which may include instructions for generating a first set of control signals for actuating the clutch 320 to prevent the wheel-hop condition. The memory 381 may include a pre-protection control module 388, which may include instructions for generating a second set of control signals for actuating the clutch 320 in preparation for the first set of control signals. The estimator module 382, the estimator calibration control module 384, the protection control module 386, and the pre-protection control module 388 are described in greater detail below in reference to FIGS. 4-7. Additionally, methods for estimating the intensity of the wheel-hop condition and taking the preventative action to reduce, eliminate, and/or mitigate the effects of the wheel-hop using the estimator module 382, the estimator calibration control module 384, the protection control module 386, and the pre-protection control module 388 are described in FIGS. 8-11.

Figure 4:
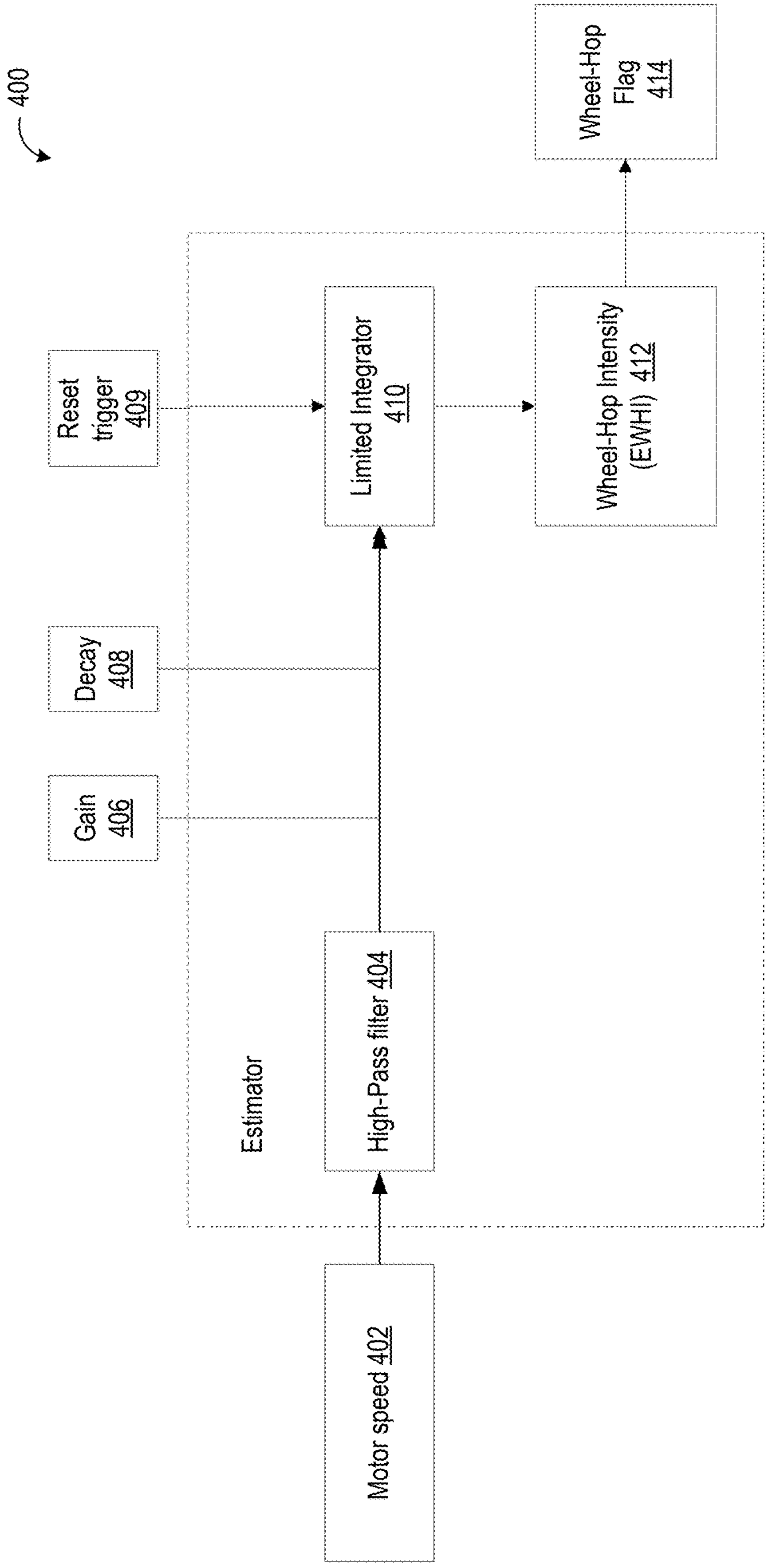
FIG. 4 is a schematic diagram of an exemplary wheel-hop estimator module of a transmission control unit (TCU) of the vehicle.

Referring now to FIG. 4, an estimator module 400 of a TCU of an e-axle is shown, also referred to herein as an estimator 400, which may be a non-limiting example of estimator module 382 of TCU 380 of FIG. 3. Estimator 400 may take as input a motor speed 402, which may be a speed of electric motor 301 as measured by a motor speed sensor (e.g., motor speed sensor 154 of FIG. 1). Estimator 400 may output a wheel-hop flag 414, which may indicate whether an estimated intensity of the wheel-hop by the estimator 400 based on the motor speed exceeds a threshold intensity. The wheel-hop flag 414 may be a Boolean, for example, where the estimator 400 outputs a zero (e.g., FALSE) if the estimated intensity of the wheel-hop does not exceed the threshold, and a one (e.g., TRUE) if the estimated intensity of the wheel-hop exceeds the threshold.

The estimator 400 may include a high-pass filter 404 and a limited integrator 410. The high-pass filter 404 may filter out motor speeds that are below a predetermined cutoff frequency. In one example, the predetermined cutoff frequency is 7 Hz. Filtered motor speeds outputted by the high-pass filter may be adjusted by a gain component 406, which may result in an increased motor speed. The increased motor speed may be adjusted by a decay component 408, which may decrease the motor speed. The gain component 406 and the decay component 408 may be received by an estimator calibration control module (e.g., estimator calibration control module 384), as described below. The adjusted motor speed may be an input into the limited integrator 410. The limited integrator may accumulate adjusted motor speed data over a duration, which may be periodically reset. The limited integrator 410 may output a wheel-hop intensity (EWHI) value 412, which may be a percent indicating an estimated intensity of the wheel-hop condition. The limited integrator 410 performs a time domain integration of the high-pass filtered motor speed. Based on the EWHI value 412, the estimator 400 outputs an appropriate wheel-hop flag 414, meaning TRUE if the EWHI value 412 is above a threshold intensity, and FALSE if the EWHI value 412 is below the threshold intensity.

The limited integrator 410 may also receive as an input a reset trigger 409, which may be an indication that generates a reset of the estimator 400. When the estimator 400 is reset, the duration over which the limited integrator 410 accumulates the motor speed data may be reset, meaning that motor speed data prior to the reset is discarded and new motor speed data is accumulated by the limited integrator 410. The reset trigger 409 may be a Boolean, for example, where if the reset trigger 409 is a zero (e.g., FALSE) then the estimator 400 is not reset, and if the reset trigger 409 is a one (e.g., TRUE) then the estimator 400 is reset.

Figure 5:
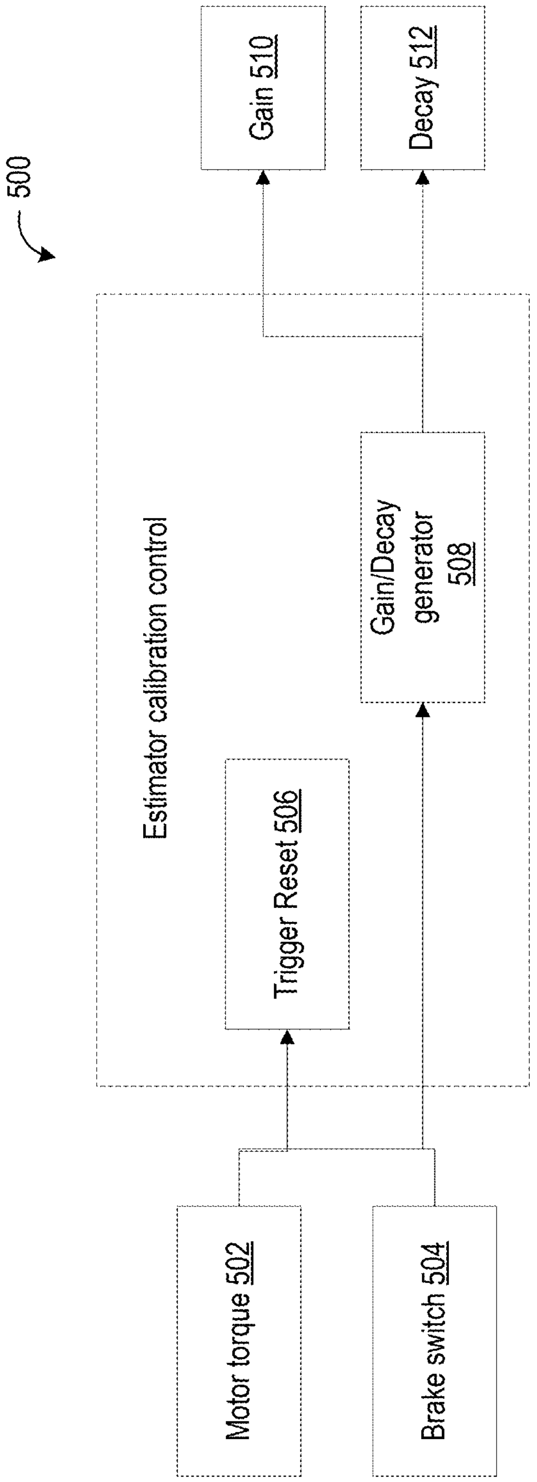
FIG. 5 is a schematic diagram of an exemplary wheel-hop estimator calibration control module of the TCU.

FIG. 5 shows an estimator calibration control module 500 of a TCU of an e-axle, also referred to herein as an estimator calibration control 500, which may be a non-limiting example of estimator calibration control module 384 of TCU 380 of FIG. 3. The estimator calibration control 500 may take as input a motor torque 502, which may be a torque of electric motor 301 as measured by a motor torque sensor (e.g., motor torque sensor 156 of FIG. 1). The estimator calibration control 500 may also take as input a brake switch 504, which may be TRUE if a brake pedal of the vehicle is pressed by the driver, or FALSE if the brake pedal is released by the driver. The estimator calibration control 500 may output a gain 510 and a decay 512 based on the motor torque 502 and the brake switch 504, which may be inputs to the estimator 400 described above (e.g., the gain component 406 and the decay component 408).

The estimator calibration control 500 may include a trigger reset 506 and a gain/decay generator 508. The motor torque 502 and the brake switch 504 may be inputted into the trigger reset 506, which may output a trigger reset flag based on the received motor torque 502 and the brake switch 504. The trigger reset flag may be TRUE if a reset of the estimator 400 of FIG. 4 is to be triggered, or FALSE if the reset is not to be triggered. The motor torque 502 and the brake switch 504 may also be inputted into the gain/decay generator 508, which may output the gain 510 and the decay 512 based on the motor torque 502 and the brake switch 504.

Figure 6:
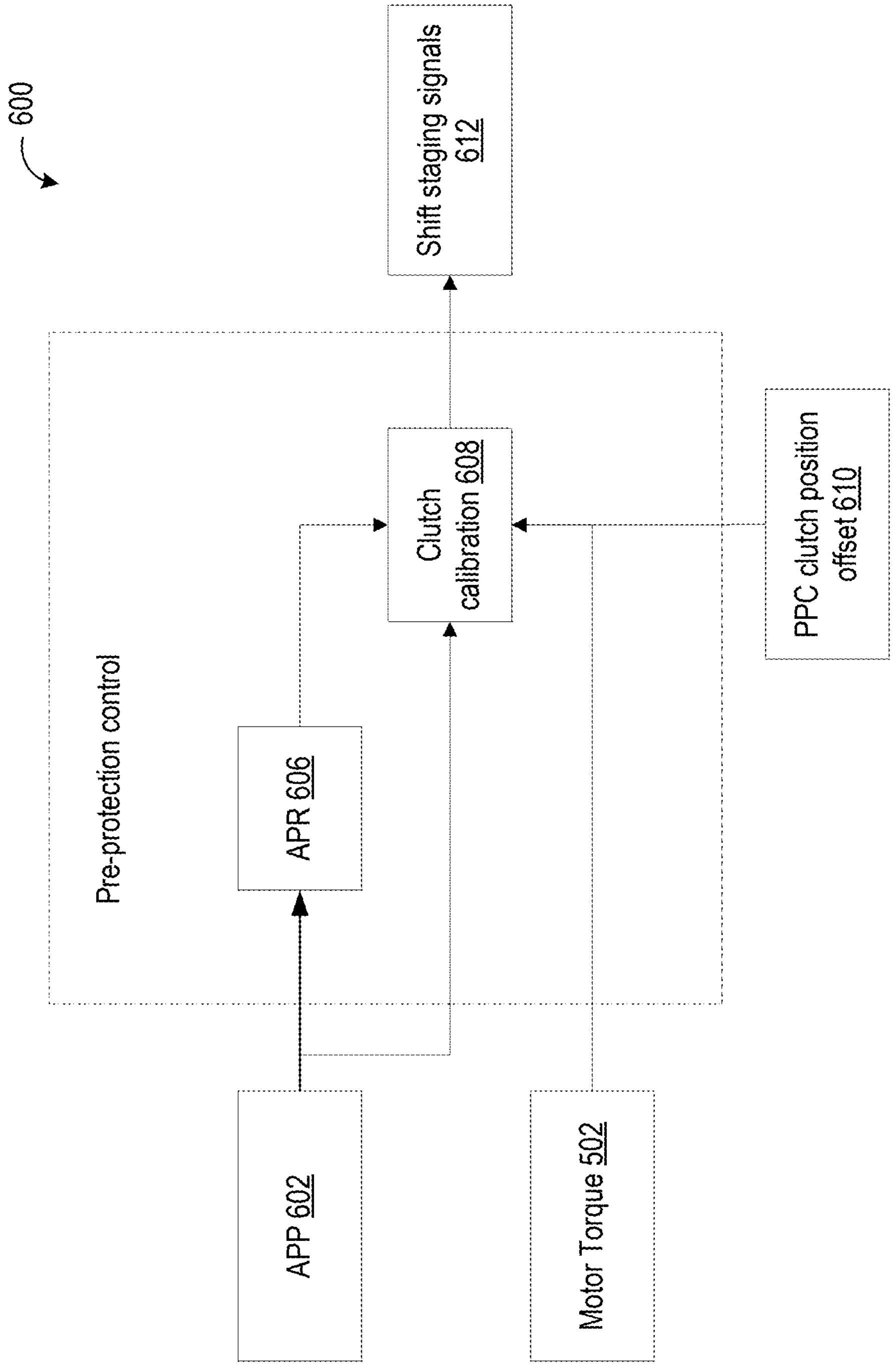
FIG. 6 is a schematic diagram of an exemplary wheel-hop pre-protection control module of the TCU.

FIG. 6 shows a pre-protection control module 600 of a TCU of an e-axle, also referred to herein as a pre-protection control 600, which may be a non-limiting example of pre-protection control module 388 of TCU 380 of FIG. 3. The pre-protection control 600 may take as input an APP of an accelerator of the vehicle, which may be received from a pedal position sensor such as accelerator pedal position sensor 152 of FIG. 1, the motor torque 502 described above in reference to FIG. 5, and a PPC clutch position offset 610, which is a calibration of a clutch of the vehicle from a fully engaged position of the clutch. In various examples, the PPC clutch position offset 610 may be retrieved from a lookup table stored in a memory of the TCU (e.g., memory 381). The pre-protection control 600 may output shift staging signals 612, which may actuate a clutch of the vehicle (e.g., clutch 320 of transmission 350 of FIG. 3) to a first position (e.g., a shallow engagement), in advance of the protective action for preventing the wheel-hop.

The pre-protection control 600 may generate an accelerator pedal rate (APR) 606 from the APP 602. The APR 606 may be a time derivative of the APP 602. The APR 606 may be an input into a clutch calibration block 608, which may perform a clutch calibration 608 based on the PPC clutch position offset, the APP 602, the motor torque 502, and the APR 606. The shift staging signals 612 may be generated as a result of the clutch calibration 608.

Figure 7:
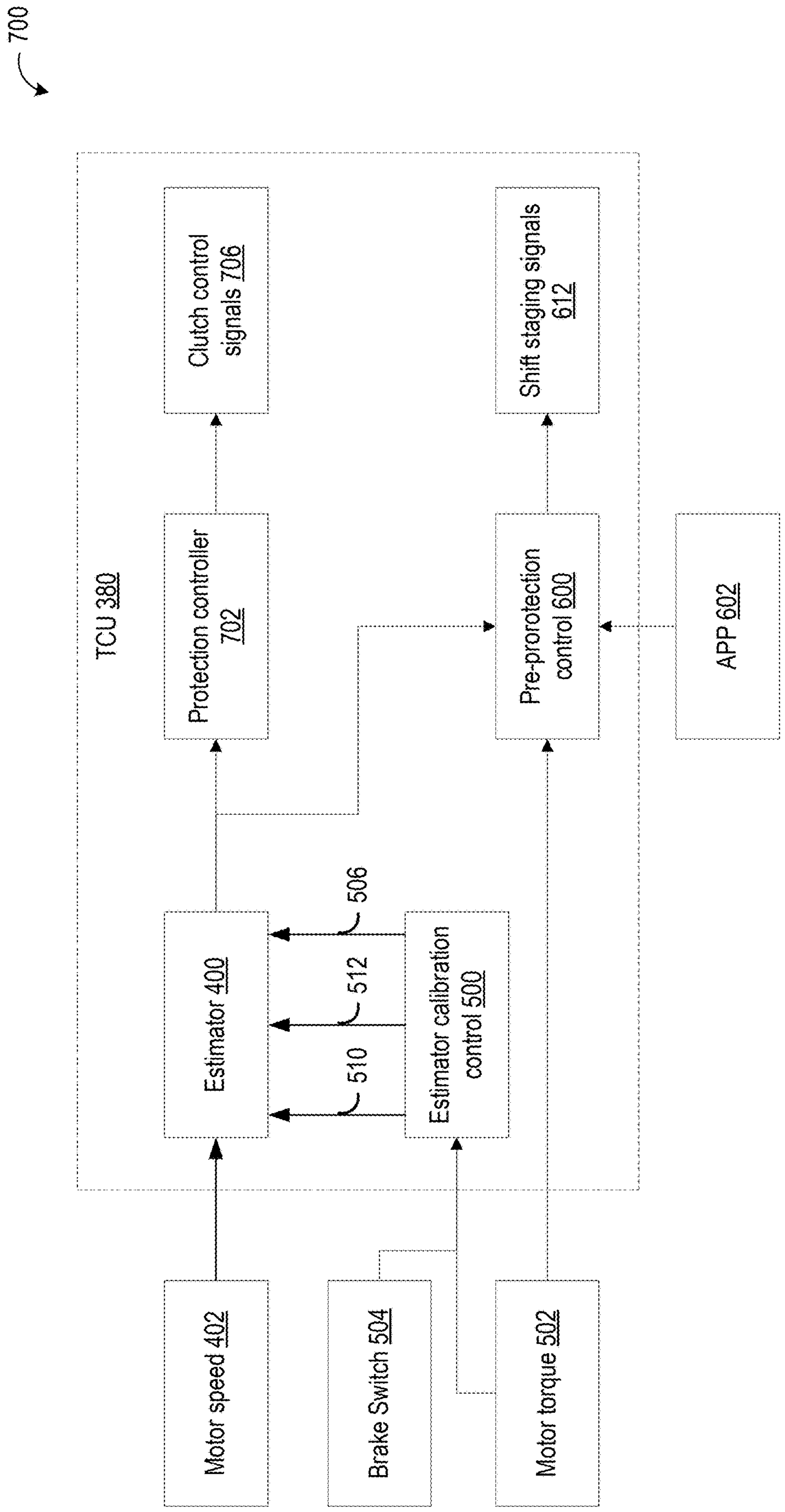
FIG. 7 is a schematic diagram of an exemplary flow of data through a wheel-hop protection routine of the TCU.

FIG. 7 shows schematic diagram 700 illustrating a flow of data through the TCU 380 during the calculation of the preventative action to reduce, eliminate, and/or mitigate the effects of the wheel-hop using the estimator 400, the estimator calibration control 500, the pre-protection control 600, and a protection controller 702, which may be a non-limiting example of the protection control module 386 of TCU 380 of FIG. 3. In other words, schematic diagram 700 shows how the estimator 400, the estimator calibration control 500, the pre-protection control 600, and the protection controller 702 work in conjunction to disconnect an electric motor of the vehicle (e.g., the electric motor 301) from an output of a transmission of the vehicle to prevent axle damage caused by high inertial torque as a result of the wheel-hop, based on the motor speed 402, the brake switch 504, the motor torque 502, and the APP 602. As described in greater detail below in reference to FIGS. 8-11, disconnecting the electric motor may be achieved by an actuation of the clutch 320 of FIG. 3 to a neutral position.

The disconnection of the electric motor may be achieved via shift staging signals 612 and clutch control signals 706 generated by the TCU 380. To generate the shift staging signals 612 and clutch control signals 706, the brake switch 504 and the motor torque 502 may be inputted into the estimator calibration control 500, as described above in reference to FIG. 5. The gain 510, decay 512, and trigger reset 506 outputted by the estimator calibration control 500 are inputted into the estimator 400 along with the motor speed 402. The estimator 400 generates the wheel-hop flag, which is inputted into the protection controller 702. If the wheel-hop flag indicates an above-threshold intensity of the wheel-hop, the motor torque 502 and the APP 602 are inputted into the pre-protection control 600, which may send the shift staging signals 612 to adjust a clutch of the vehicle by the clutch position offset, in anticipation of the preventative action. The protection controller 702 generates clutch control signals 706 to actuate the clutch 320 to the neutral position, thereby disconnecting the electric motor from the driveline of the vehicle.

Figure 8:
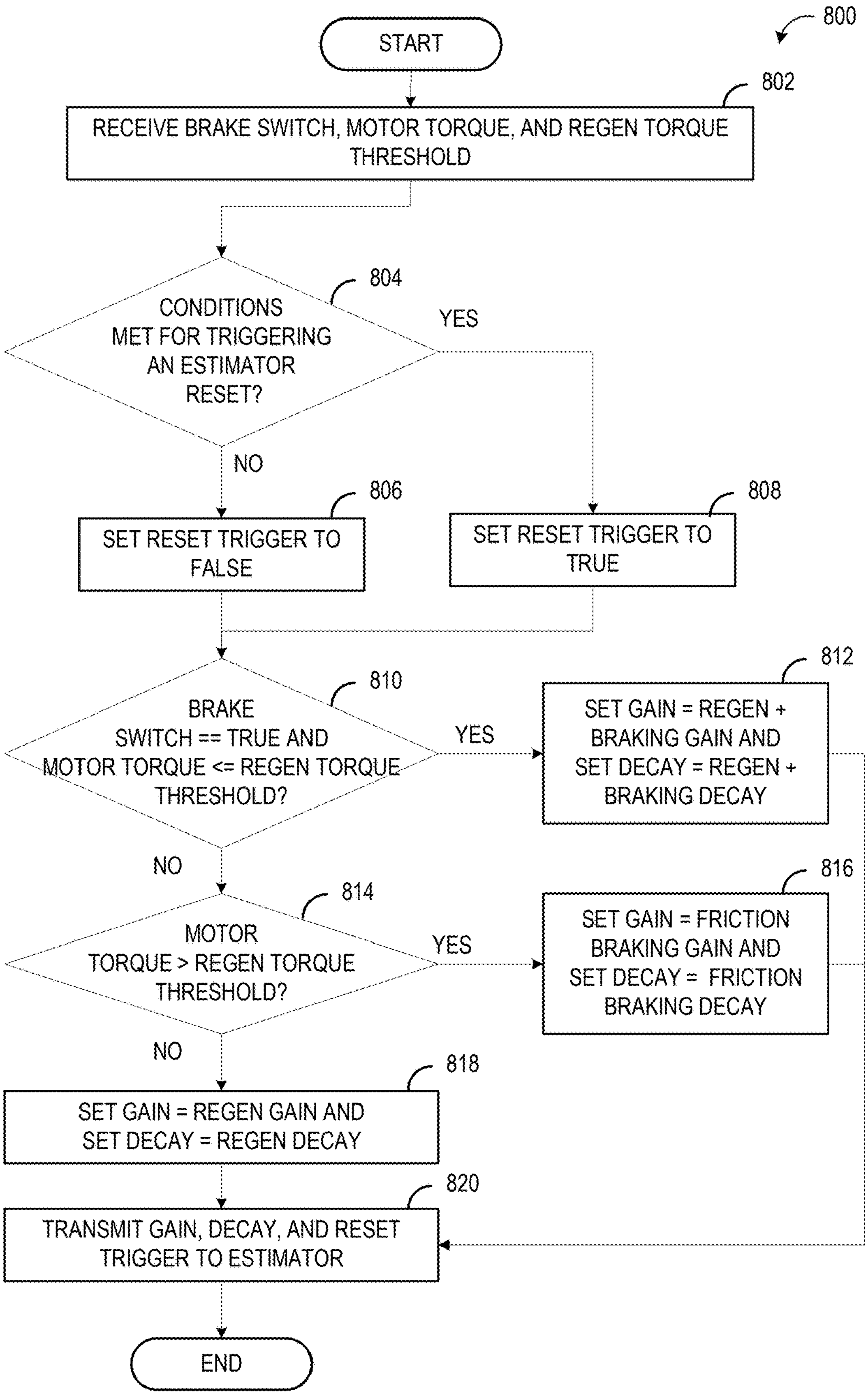
FIG. 8 is a flowchart illustrating an exemplary method of the wheel-hop estimator calibration control module.

Referring now to FIG. 8, a method 800 is shown for calibrating an estimator module (e.g., estimator) of a TCU (e.g., the estimator module 400 of FIG. 4) in preparation for carrying out a protective action to prevent and/or mitigate the effects of a wheel-hop condition of a vehicle such as vehicle 100 of FIG. 1. Method 800 may be performed by a processor of a TCU such as TCU 380 of FIG. 3, based on instructions stored in an estimator calibration control module, such as the estimator calibration control module 384 of FIG. 3 and the estimator calibration control 500 of FIG. 5.

Method 800 begins at 802, where method 800 includes receiving a brake switch value, a motor torque value, and a regenerative braking torque threshold value. The brake switch value may be generated by and received from an electronic brake controller of the vehicle. The motor torque value may be received from a motor torque sensor, such as motor torque sensor 156 of FIG. 1. The regenerative braking torque threshold value may be a predefined value retrieved from a memory of the TCU.

At 804, method 800 includes determining whether conditions are met to trigger a reset of the estimator. In one example, the conditions may be met when two sub-conditions are met. The first sub-condition may be where the received motor torque is less than or equal to zero OR the wheel-hop flag is equal to TRUE OR the brake switch is equal to TRUE. The second sub-condition may be that a speed sync flag is equal to FALSE. The speed sync flag indicates whether the TCU has started a motor speed control phase of a respective gear-shift. If both of the sub-conditions are met, then the conditions may be met to trigger the reset of the estimator.

Thus, if at 804 the conditions are met, method 800 proceeds to 806, where method 800 includes setting a reset trigger value to TRUE. Alternatively, if at 804 the conditions are not met, method 800 proceeds to 808, where method 800 includes setting the reset trigger value to FALSE. The reset trigger value may be used by the estimator, as described below in reference to FIG. 9.

In steps 810-818 of method 800, a gain value and a decay value to be applied to a motor speed at the estimator are calculated, based on various conditions. At 810, method 800 includes determining whether the brake switch value is TRUE AND the motor torque value is less than or equal to the regenerative braking torque threshold. If the brake switch value is TRUE AND the motor torque value is less than or equal to the regenerative braking torque threshold, then method 800 proceeds to 812. At 812, method 800 includes setting the gain equal to a sum of a regenerative braking gain and a friction braking gain, and setting the decay equal to a sum of the regenerative braking decay and a friction braking decay. The regenerative braking gain and decay may be predetermined experimentally on the vehicle in order to calculate EWHI accurately and reliably, specifically for regenerative braking.

Alternatively, if the brake switch value is not TRUE OR the motor torque value is not less than or equal to the regenerative braking torque threshold, then method 800 proceeds to 814. At 814, method 800 includes determining whether the motor torque value is greater than the regenerative braking torque threshold. If the motor torque value is greater than the regenerative braking torque threshold, method 800 proceeds to 816. At 816, method 800 includes setting the gain equal to the friction braking gain, and setting the decay equal to the friction braking decay. The friction braking gain and decay may be predetermined experimentally on the vehicle in order to calculate EWHI accurately and reliably, specifically for friction braking.

Alternatively, if at 814 the motor torque is not greater than the regenerative braking torque threshold, method 800 proceeds to 818. At 818, method 800 includes setting the gain equal to the regenerative braking gain, and setting the decay equal to the regenerative braking decay. In this way, the gain and decay values are determined based on either or both of a regenerative braking component and a friction braking component. At 820, method 800 includes transmitting the gain, decay, and reset trigger values to the estimator, and method 800 ends.

Figure 9:
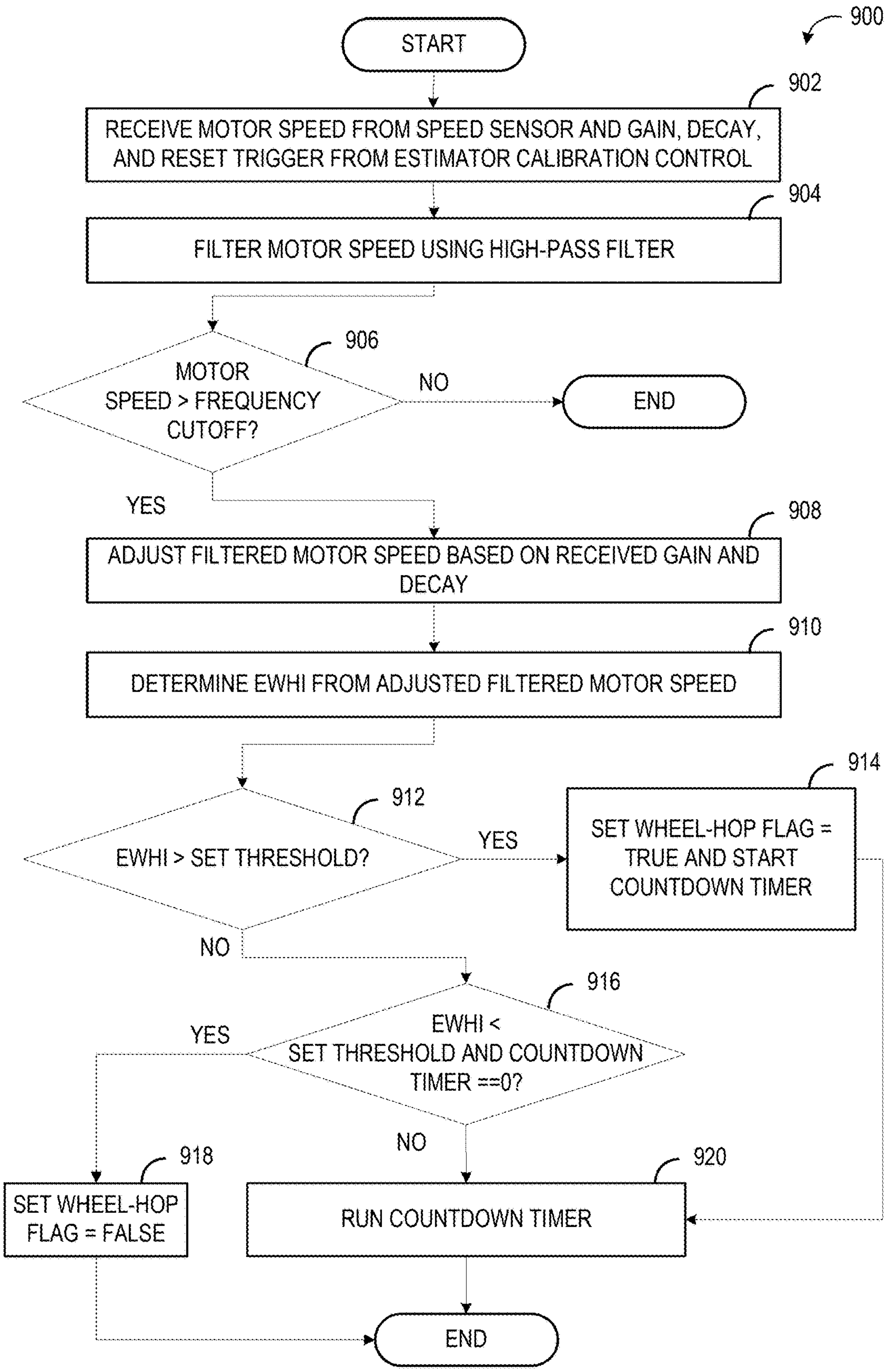
FIG. 9 is a flowchart illustrating an exemplary method of the wheel-hop estimator module.

Referring now to FIG. 9, a method 900 is shown for estimating an intensity of a wheel-hop condition of a vehicle such as vehicle 100 of FIG. 1. Method 900 may be performed by a processor of a TCU such as TCU 380 of FIG. 3, based on instructions stored in an estimator module (e.g., estimator) of the TCU (e.g., the estimator module 400 of FIG. 4).

Method 900 begins at 902, where method 900 includes receiving a motor speed of an electric motor of the vehicle (e.g., electric motor 301 of FIG. 3), and a gain value, a decay value, and a reset trigger value generated by an estimator calibration control module, such as the estimator calibration control module 384 of FIG. 3 and the estimator calibration control 500 of FIG. 5. The gain value, the decay value, and the reset trigger value may be generated in accordance with method 800 of FIG. 8 described above. The motor speed may be received from a motor speed sensor, such as motor speed sensor 154 of FIG. 1.

At 904, method 900 includes filtering the received motor speed using a high-pass filter, and at 906, method 900 includes determining whether an amplitude of the motor speed exceeds a cutoff value (e.g., threshold) of the high-pass filter. In one example, the high-pass filter has a 7 Hz cutoff value, where if the amplitude is greater than 7 Hz, the answer is YES and method 900 proceeds to 908. Alternatively, if at 906 it is determined that the amplitude is less than the cutoff value, it may be inferred that a probability of the wheel-hop condition occurring is low, and/or that an estimated intensity of a potential wheel-hop condition is low, whereby method 900 ends.

Figure 23:
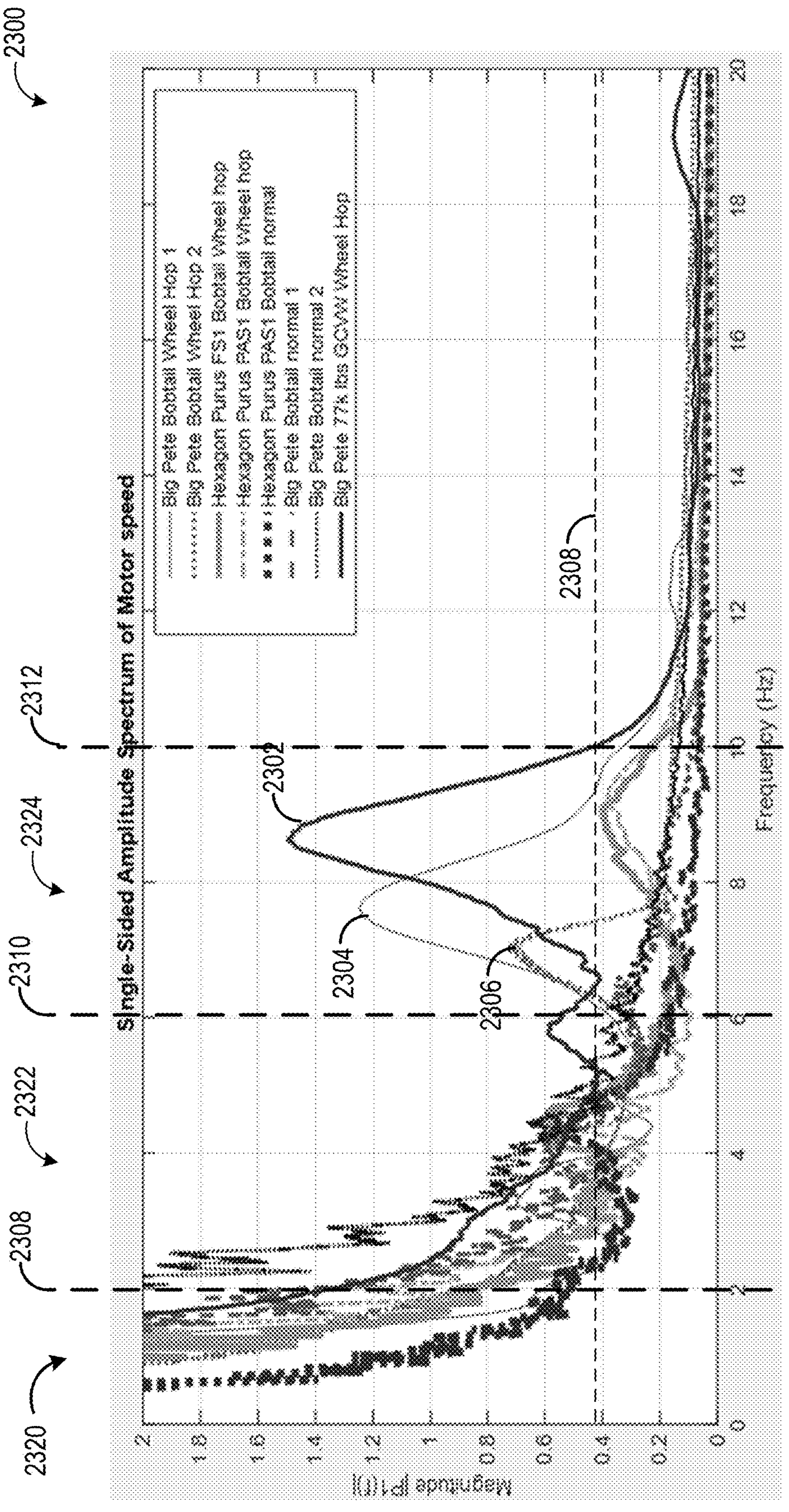
FIG. 23 is an exemplary graph illustrating a single-sided amplitude spectrum of motor speeds of various vehicles during wheel-hop conditions.

In other words, the amplitude of the motor speed may provide an indication of a probability of the wheel-hop condition. This may be illustrated by FIG. 23. Turning briefly to FIG. 23, a graph 2300 is shown that includes various plots of a single-sided amplitude of motor speeds of various vehicles having suspended multi-speed e-axles, on the y axis, against a frequency of the motor speed in Hz. A first portion 2320 of graph 2300 (to the left of a dashed line 2308) may indicate normal driving. A second portion 2322 of graph 2300 (between the dashed line 2308 and a dashed line 2310) may indicate a speed sync with roll-on operation. This region of the indicated single-sided amplitude spectrum indicates the amplitude of the motor speed oscillations caused by the speed-synchronization phase and the torque roll-on phase of a respective gear shift. A third portion 2324 of graph 2300 (between the dashed line 2310 and a dashed line 2312) may include examples of operation during the wheel-hop condition. Specifically, of the various plots shown in graph 2300, a first plot 2302, a second plot 2304, and a third plot 2306 show the wheel-hop condition observed as distinct peaks (e.g., higher-than-average motor speed amplitudes) between frequencies of 7 Hz and 10 Hz. Thus, due to a sufficient separation of frequency between normal operation and the wheel-hop condition, a test for predicting the wheel-hop condition may include first measuring the motor speed amplitude of an electric motor within a specific frequency range, and determining whether the motor speed amplitudes within the specific frequency range exceed a threshold magnitude. For example, the threshold magnitude may be indicated by a dashed line 2308.

Further examples of the wheel-hop condition are shown in a series of graphs of FIGS. 19-22. Each graph of the series of graphs depicts rotations per minute (RPM) of an electric motor of an e-axle of a vehicle, such as electric motor 301 of e-axle 190 of FIGS. 1, 2 and 3, on the y axis, against time in milliseconds on the x axis, under different operating conditions where wheel-hop occurs.

Figure 19:
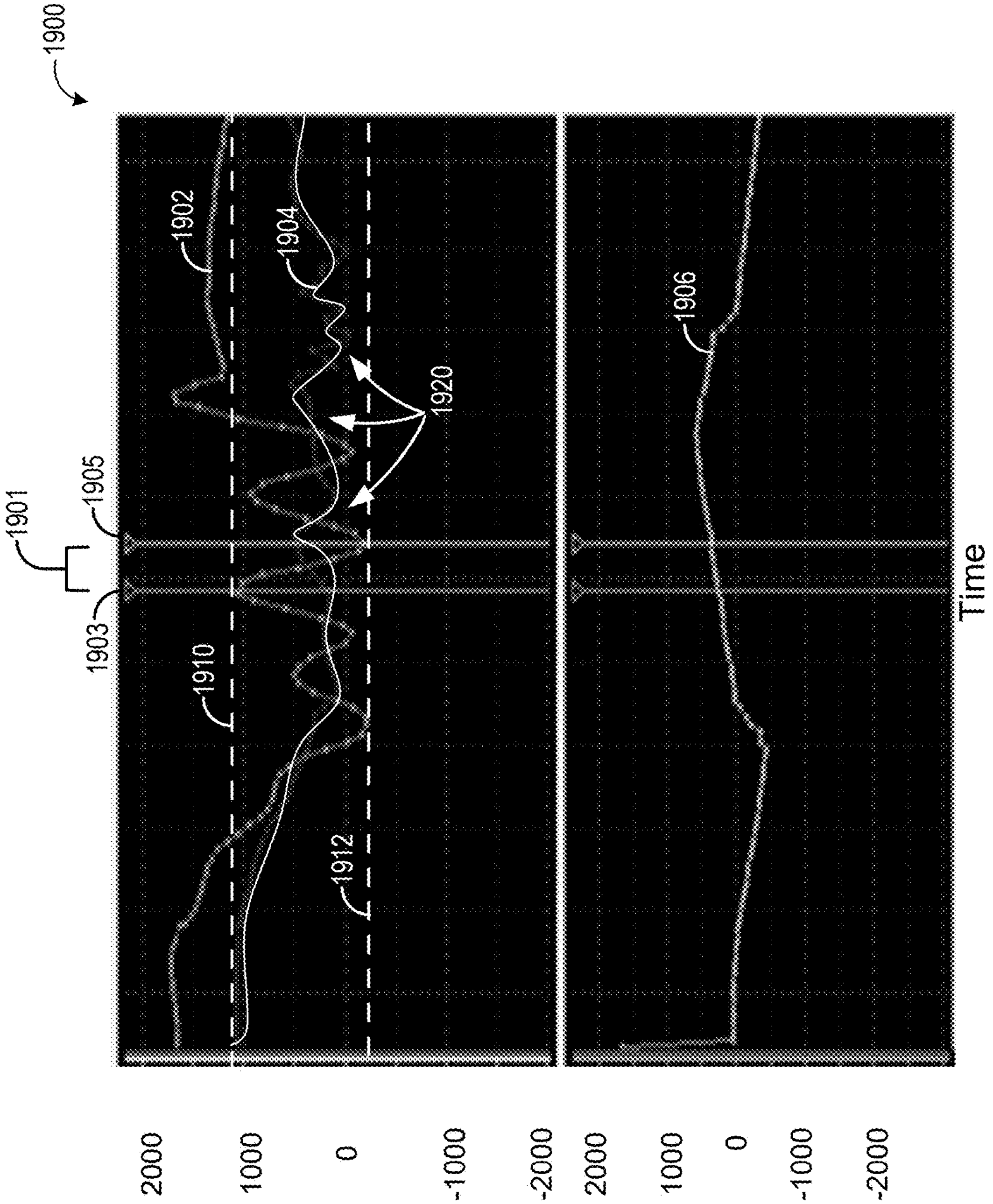
FIG. 19 is a first exemplary graph illustrating a first motor speed of the vehicle during a first wheel-hop condition.

FIG. 19 shows a first graph 1900 that shows an operation of the e-axle where the wheel-hop occurs under conditions of low motor torque and high friction braking. As a reference, a duration 1901 between a first vertical line 1903 and a second vertical line 1905 corresponds to 50 ms. The first graph 1900 includes a first plot 1902 of a rotor speed (e.g., motor speed) of the electric motor; a second plot 1904 that shows a speed of an output shaft of a transmission of the e-axle (e.g., output shaft 336 of transmission 350 of FIG. 3); and a third plot 1906 that shows a torque of the electric motor. The wheel-hop condition is observed as a series of discontinuities 1920 in the output speed (e.g., the second plot 1904). The intensity of the wheel-hop condition is correlated with, and may be estimated or predicted by a series of oscillations of the motor speed (e.g., the first plot 1902) in an RPM range indicated between a first dashed line 1910 and a second dashed line 1912. The RPM range spans approximately 1300 RPM. As the motor speed oscillates, the wheel-hop condition becomes progressively more pronounced. As a result, an intensity of the wheel-hop condition may be estimated by monitoring the fluctuations in the motor speed, as described in method 900 of FIG. 9.

Figure 20:
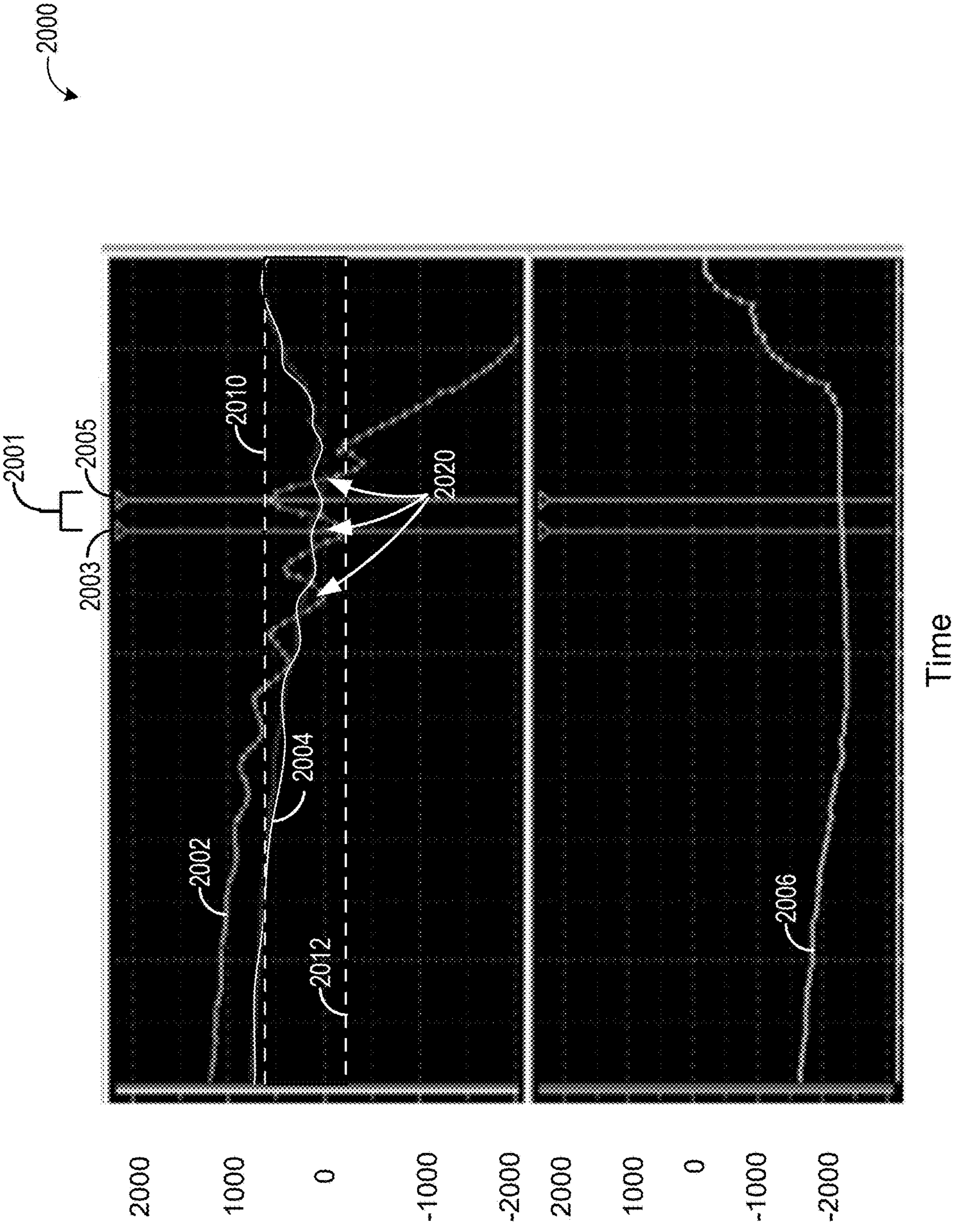
FIG. 20 is a second exemplary graph illustrating a second motor speed of the vehicle during a second wheel-hop condition.
Figure 21:
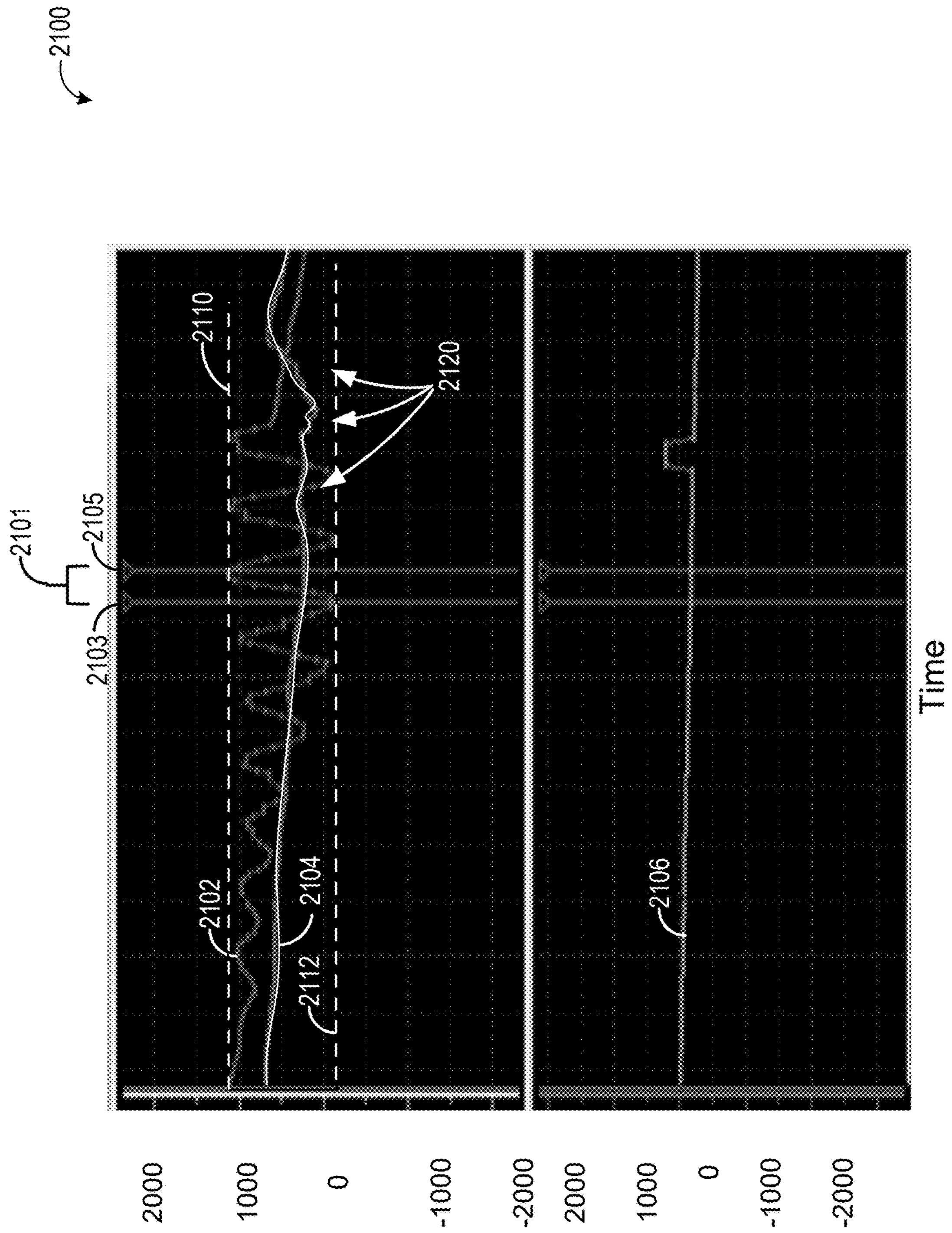
FIG. 21 is a third exemplary graph illustrating a third motor speed of the vehicle during a third wheel-hop condition.
Figure 22:
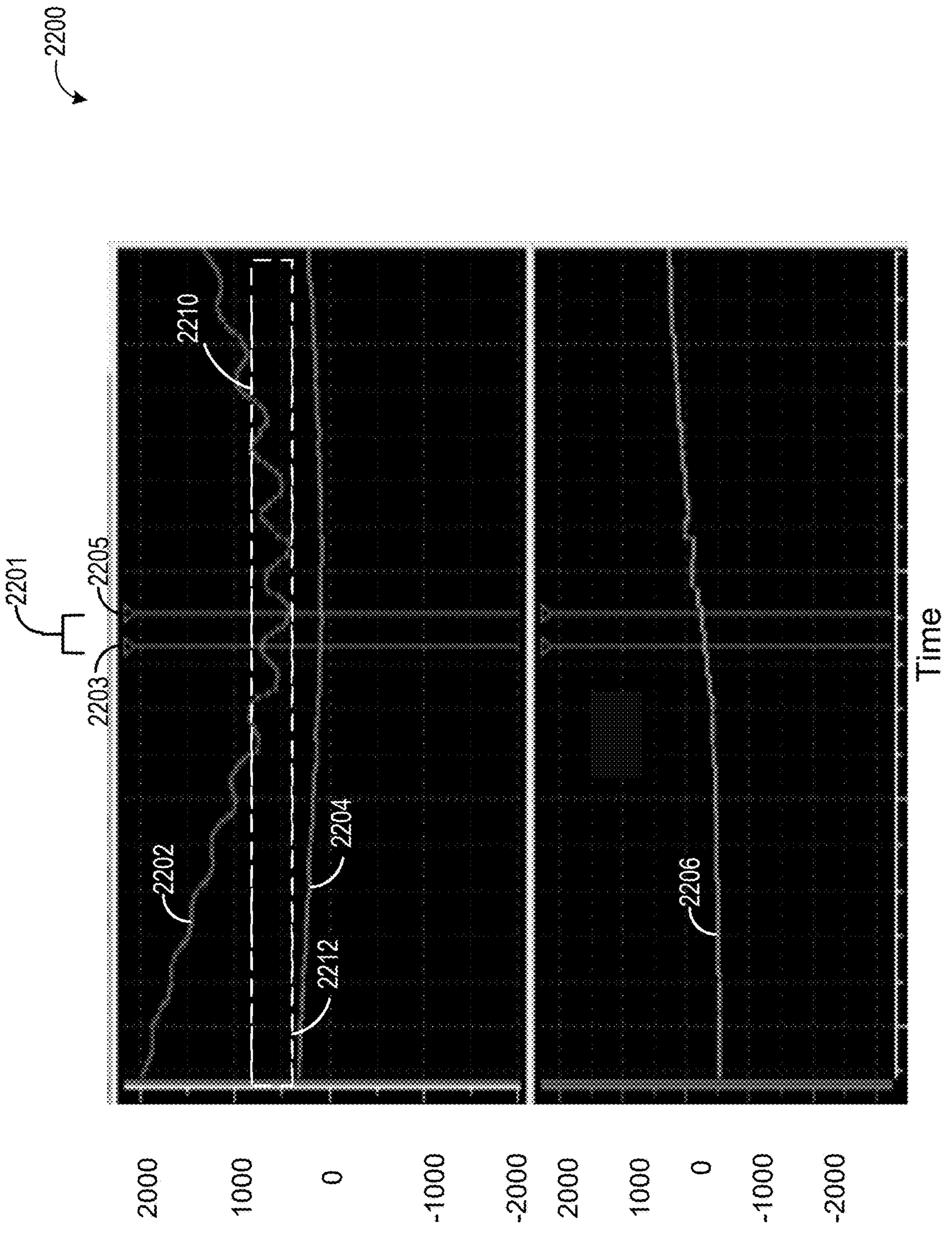
FIG. 22 is a fourth exemplary graph illustrating a fourth motor speed of the vehicle during a fourth wheel-hop condition.

Similar behavior is observed in FIGS. 20-22. FIG. 20 shows a second graph 2000 that shows an operation of the e-axle where the wheel-hop occurs under conditions of high motor regeneration torque. As a reference, a duration 2001 between a first vertical line 2003 and a second vertical line 2005 corresponds to 50 ms. The second graph 2000 includes a first plot 2002 of a motor speed of the electric motor; a second plot 2004 that shows a speed of an output shaft of the transmission of the e-axle; and a third plot 2006 that shows a torque of the electric motor. The wheel-hop condition is observed as a series of oscillations 2020 of the motor speed (e.g., the first plot 2002) in an RPM range indicated between a first dashed line 2010 and a second dashed line 2012. The RPM range in FIG. 20 spans approximately 800 RPM.

FIG. 21 shows a third graph 2100 that shows an operation of the e-axle where the wheel-hop occurs under conditions of low motor torque and high friction braking. As a reference, a duration 2101 between a first vertical line 2103 and a second vertical line 2105 corresponds to 50 ms. The third graph 2100 includes a first plot 2102 of a motor speed of the electric motor; a second plot 2104 that shows a speed of an output shaft of the transmission of the e-axle; and a third plot 2106 that shows a torque of the electric motor. The wheel-hop condition is observed as a series of oscillations 2120 of the motor speed (e.g., the first plot 2102) in an RPM range indicated between a first dashed line 2110 and a second dashed line 2112. The RPM range in FIG. 21 spans approximately 1300 RPM.

FIG. 22 shows a fourth graph 2200 that shows an operation of the e-axle where a light wheel-hop is intentionally generated in a first gear of the vehicle. As a reference, a duration 2201 between a first vertical line 2203 and a second vertical line 2205 corresponds to 50 ms. The fourth graph 2200 includes a first plot 2202 of a motor speed of the electric motor; a second plot 2204 that shows a speed of an output shaft of the transmission of the e-axle; and a third plot 2206 that shows a torque of the electric motor. The wheel-hop condition is observed as a series of oscillations of the motor speed (e.g., the first plot 2202) in an RPM range indicated between a first dashed line 2210 and a second dashed line 2212. The RPM range in FIG. 22 spans approximately 500 RPM.

As can be seen in FIGS. 19-22, when severe braking is performed, the e-axle begins to transition into wheel-hop rapidly, which can be seen by the rapid oscillations of the motor speed during the braking events, which are active during the entirety of the duration shown in these figures.

Returning now to FIG. 9, at 908, method 900 includes adjusting the filtered motor speed (e.g., above the high-pass cutoff) based on the received gain value and decay value, and at 910, method 900 includes calculating an estimated wheel-hop intensity (EWHI) from the adjusted filtered motor speed. In various examples, calculating the estimated wheel-hop intensity from the adjusted filtered motor speed comprises accumulating adjusted filtered motor speed data at a limited integrator (e.g., the limited integrator 410 of FIG. 4), which performs a time domain integration of the high-pass filtered motor speed.

At 912, method 900 includes determining whether the EWHI is greater than a set threshold, corresponding to a threshold intensity of the wheel-hop condition that when achieved, triggers the protective action. For example, the set threshold may be 50%, where if the EWHI increases above 50%, the protective action is generated, and if the EWHI does not increase above 50%, the protective action is not generated. The set threshold may be stored in a memory of the TCU and retrieved by the estimator.

If at 912 it is determined that the EWHI is greater than the set threshold, method 900 proceeds to 914. At 914, method 900 includes setting a wheel-hop flag to TRUE, and starting a countdown timer of the estimator. The countdown timer may establish a duration after which the estimator module is reset. When the estimator module is reset, the limited integrator may discard accumulated motor speed data and begin accumulating new motor speed data, and the wheel-hop flag may be reset to FALSE for subsequent monitoring of the motor speed for a new wheel-hop condition. Alternatively, if at 912 it is determined that the EWHI is not greater than the set threshold, method 900 proceeds to 916.

At 916, method 900 includes determining whether the EWHI is less than the set threshold AND the countdown time is equal to zero. If the EWHI is less than the set threshold AND the countdown time is equal to zero, then method 900 proceeds to 918, where method 900 includes setting the wheel-hop flag to FALSE, and method 900 ends.

Alternatively, if the EWHI is not less than the set threshold OR the countdown time is not equal to zero, then method 900 proceeds to 920. At 920, method 900 includes running the countdown timer, and method 900 ends.

Figure 10:
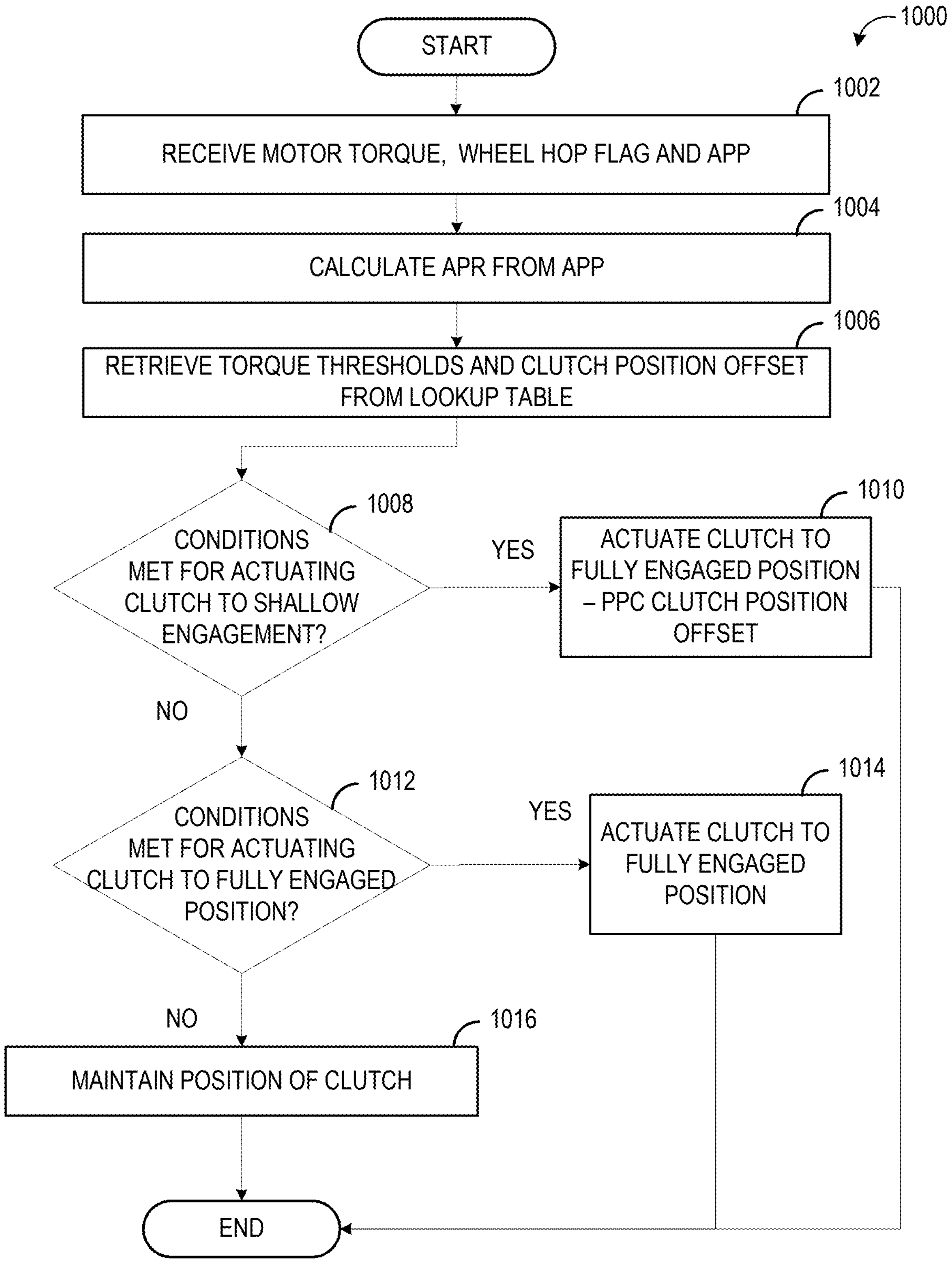
FIG. 10 is a flowchart illustrating an exemplary method of the wheel-hop pre-protection control module.

Referring now to FIG. 10, a method 1000 is shown for preemptively adjusting a clutch of a transmission of an e-axle of a vehicle, such as transmission 350 of e-axle 190, in preparation for a protective action to prevent or mitigate the effects of a wheel-hop condition of the vehicle. Method 1000 may be performed by a processor of a TCU such as TCU 380 of FIG. 3, based on instructions stored in a pre-protection control module of the TCU (e.g., the pre-protection control 600 of FIG. 6).

Method 1000 begins at 1002, where method 1000 includes receiving a motor torque of an electric motor of the vehicle (e.g., electric motor 301 of FIG. 3), a wheel-hop flag, and an APP. The motor torque may be received from a motor torque sensor, such as torque sensor 156 of FIG. 1. The wheel-hop flag may be generated by an estimator module, such as the estimator module 382 of FIG. 3 and/or the estimator 400 of FIG. 4, in accordance with method 900 of FIG. 9 described above. The APP may be received from an APP sensor, such as APP sensor 152 of FIG. 1.

At 1004, method 1000 includes calculating an accelerator pedal rate (APR) from the APP. In various examples, the APR may be a time derivative of the APP. At 1006, method 1000 includes retrieving, from a lookup table stored in a memory of the TCU, a clutch position offset (PPC), and various threshold values relating to the APP and/or the APR. The various threshold values may include a PPC torque threshold; a threshold calibration to deactivate the PPC based on the APP (PPC OFF APP threshold); a threshold calibration to deactivate the PPC based on the APR (PPC OFF APR threshold); a threshold calibration to activate the PPC based on the APP (PPC ON APP threshold); and a threshold calibration to activate the PPC based on the APR (PPC ON APR threshold).

At 1008, method 1000 includes determining whether conditions are met for actuating a clutch of the vehicle to a shallow engagement, to increase an efficiency of actuating the clutch to a neutral position under wheel-hop conditions. In various examples, the clutch may be a clutch that selectively engages one of a third gear of the transmission and a fourth gear of the transmission (e.g., clutch 320), which may have less torque than other clutches of the vehicle. However, in other examples, the clutch may be a clutch that selectively engages one or more different gears of the transmission.

In one example, the conditions may be met for actuating the clutch to the shallow engagement when all of three sub-conditions are met. A first sub-condition of the three sub-conditions may be that the APR is less than or equal to the PPC ON APR threshold OR the APP is less than the PPC ON APP threshold. A second sub-condition of the three sub-conditions may be that an absolute value of the motor torque is less than or equal to the PCC torque threshold. A third sub-condition of the three sub-conditions may be that the wheel-hop flag is FALSE.

If the APR is less than or equal to the PPC ON APR threshold OR the APP is less than the PPC ON APP threshold, AND the absolute value of the motor torque is less than or equal to the PCC torque threshold, AND the wheel-hop flag is FALSE, then method 1000 proceeds to 1010. At 1010, method 1000 includes actuating the clutch to a position corresponding to the shallow engagement (e.g., in accordance with the shift staging signals 612 described in reference to FIG. 7), meaning, a fully engaged position minus the PPC clutch position offset, and method 1000 ends.

Alternatively, if the conditions are not met for actuating the clutch to the shallow engagement, then method 1000 proceeds to 1012. At 1012, method 1000 includes determining whether conditions are met for actuating the clutch to the fully engaged position. In one example, the conditions may be met for actuating the clutch to the fully engaged position when all of four sub-conditions are met. A first sub-condition of the four sub-conditions may be that the APR is greater than or equal to the PPC OFF APR threshold. A second sub-condition of the four sub-conditions may be that the APP is greater than the PPC OFF APP threshold. A third sub-condition of the four sub-conditions may be that the absolute value of the motor torque is less than or equal to the PCC torque threshold. A fourth sub-condition of the four sub-conditions may be that the wheel-hop flag is FALSE.

If all four of the above sub-conditions are met, method 1000 proceeds to 1014. At 1014, method 1000 includes actuating the clutch to the fully engaged position, and method 1000 ends. Alternatively, if any one of the four sub-conditions are not met, the conditions for actuating the clutch to the shallow engagement are not met, and method 1000 proceeds to 1016. At 1016, method 1000 includes maintaining a current position of the clutch, and method 1000 ends.

Figure 11:
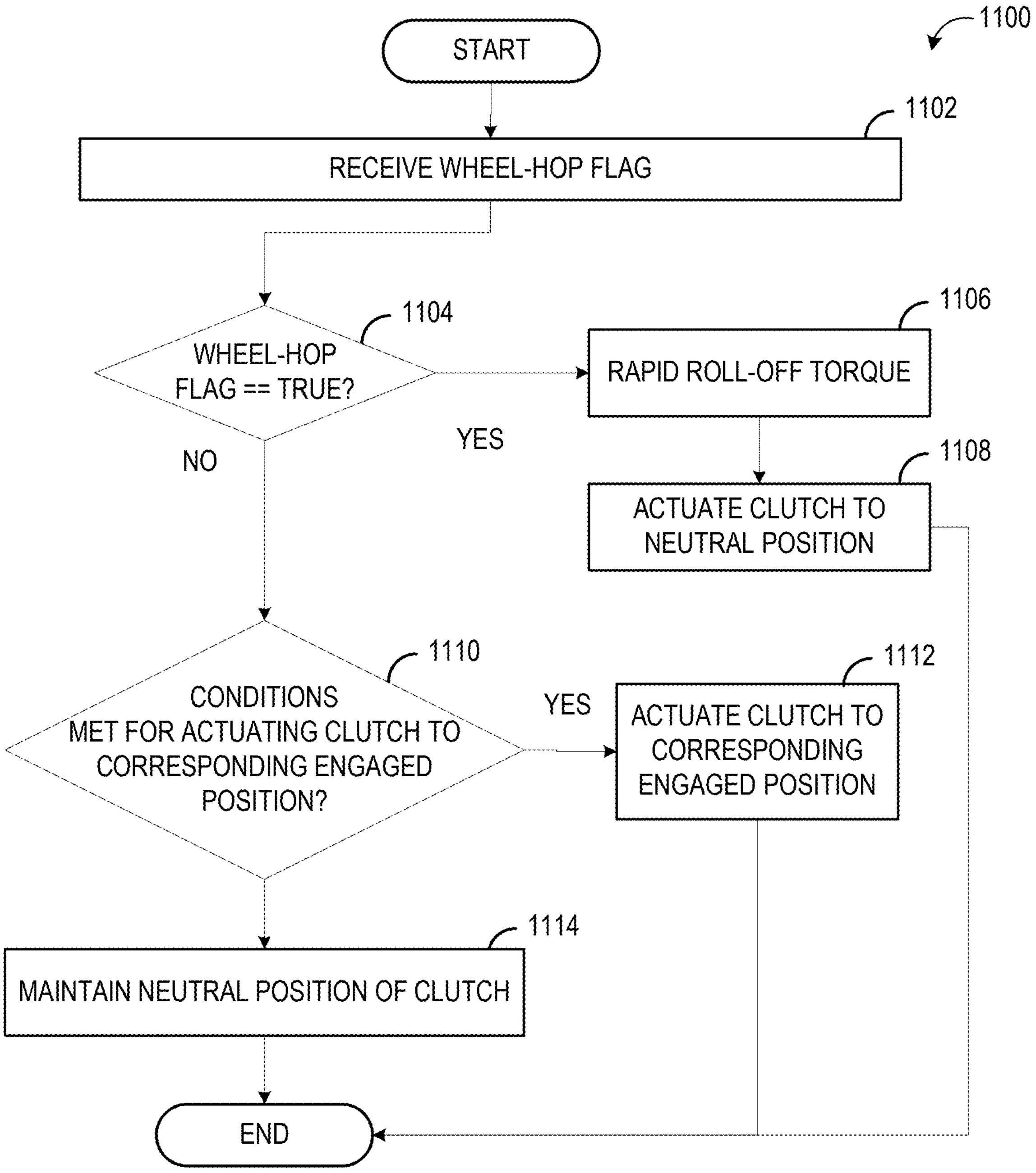
FIG. 11 is a flowchart illustrating an exemplary method for adjusting a clutch of the vehicle based on a wheel-hop prediction.

Referring now to FIG. 11, a method 1100 is shown for adjusting a clutch of a transmission of an e-axle of a vehicle, such as transmission 350 of e-axle 190, to prevent or mitigate the effects of a wheel-hop condition of the vehicle. Method 1100 may be performed by a processor of a TCU such as TCU 380 of FIG. 3, based on instructions stored in a protection control module of the TCU (e.g., the protection control module 386 of FIG. 3).

Method 1100 begins at 1102, where method 1100 includes receiving a wheel-hop flag from an estimator module (e.g., estimator module 382 of FIG. 3 and the estimator 400 of FIG. 4), which may be generated in accordance with method 900 of FIG. 9 described above.

At 1104, method 1100 includes determining whether the wheel-hop flag equals TRUE. If at 1104 the wheel-hop flag is TRUE, method 1100 proceeds to 1106. At 1106, method 1100 includes commanding a neutral torque to the motor to facilitate clutch disengagement (e.g., a rapid roll-off torque). At 1108, method 1100 includes actuating the clutch to a neutral position (e.g., in accordance with the clutch control signals 706 described in reference to FIG. 7), and method 1100 ends. In various examples, the clutch may be a clutch that selectively engages one of a third gear of the transmission and a fourth gear of the transmission (e.g., clutch 320). In other examples, the clutch may be a clutch that selectively engages one or more different gears of the transmission.

Alternatively, if at 1104 the wheel-hop flag is equal to FALSE, then it may be inferred that an estimated intensity of the wheel-hop condition is low, and method 1100 proceeds to 1110. At 1110, method 1100 includes determining whether conditions are met for actuating a clutch of the vehicle to a corresponding engaged position of a selected gear, meaning a gear selected by a user of the vehicle or by the TCU.

In one example, the conditions may be met for actuating the clutch to the corresponding engaged position when all of three sub-conditions are met. A first sub-condition of the three sub-conditions may be that the clutch is in the neutral position. A second sub-condition of the three sub-conditions may be that a speed synchronization is complete, meaning that a requested non-neutral gear can be engaged, because there is no estimated wheel-hop present. A third sub-condition of the three sub-conditions may be that a user-requested gear is not neutral.

If all of the sub-conditions are met, then method 1100 proceeds to 1112, where method 1100 includes actuating the clutch to the corresponding engaged position of the selected gear, and method 1100 ends. Alternatively, if the conditions are not met for actuating the clutch to a corresponding engaged position, then method 1100 proceeds to 1114. At 1114, method 1100 includes maintaining a neutral or non-engaged position of the clutch, and method 1100 ends.

FIGS. 12-17 show example timing diagrams that illustrate exemplary sequences of events during operation of a vehicle with a suspended e-axle, such as vehicle 100 of FIG. 1, under various driving scenarios where the wheel-hop condition described herein may occur and where a protective action is taken by a TCU (e.g., TCU 380 of FIG. 3) to prevent or mitigate the effects of the wheel-hop condition on components of a driveline of the vehicle. The protective action may include executing method 800 of FIG. 8 to calibrate an estimator module of the TCU; executing method 900 of FIG. 9 to predict a probability of the wheel-hop condition using the estimator module; executing method 1000 of FIG. 10 to adjust a clutch of a transmission of an e-axle of the vehicle to a shallow engagement, in preparation for taking the protective action; and executing method 1100 of FIG. 11 to actuate the clutch to a neutral position, to prevent the wheel-hop condition.

Figure 12:
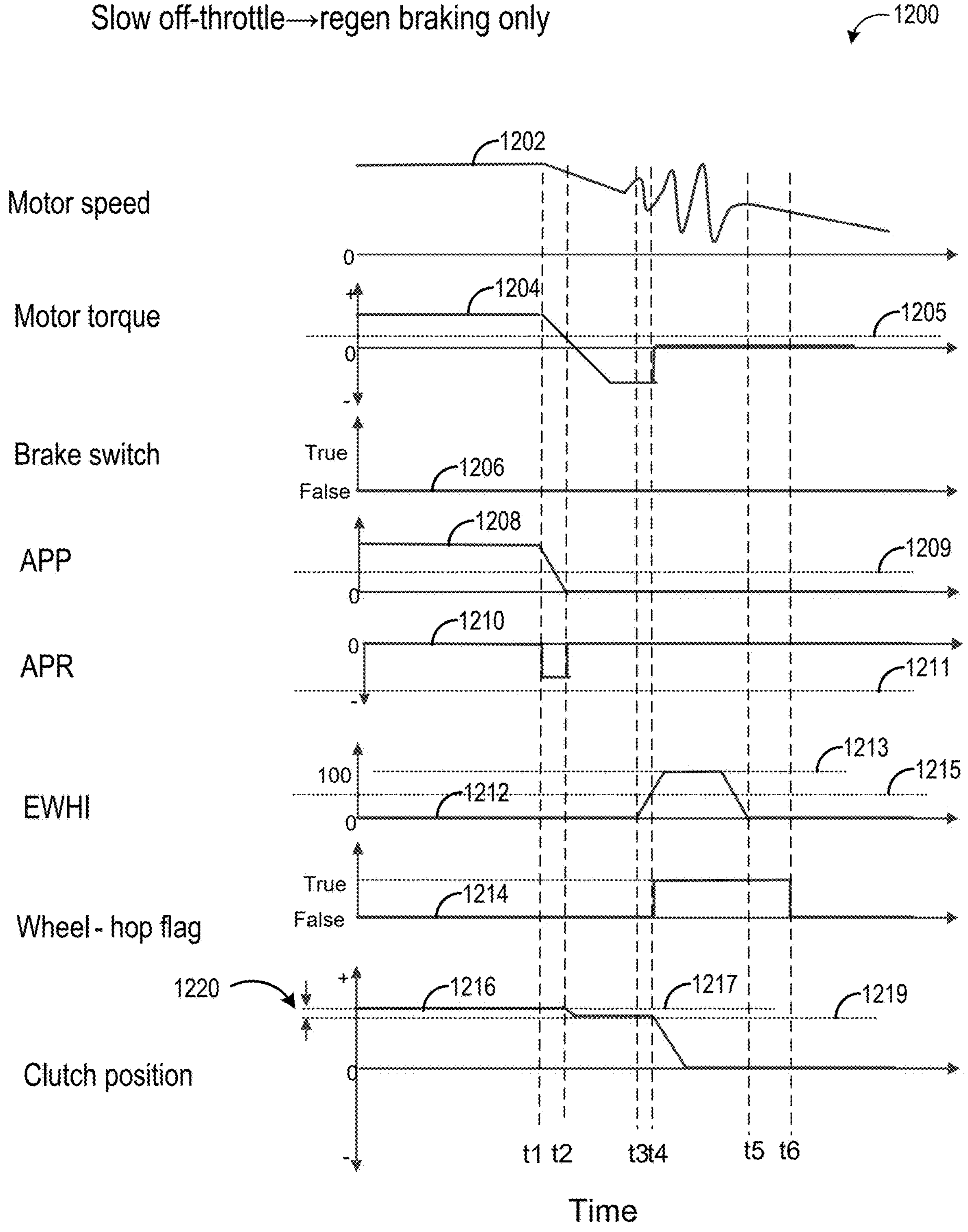
FIG. 12 is a first timing diagram illustrating a first exemplary sequence of events during operation of the vehicle under a wheel-hop condition.

Turning now to FIG. 12, a first example timing diagram 1200 shows a first exemplary sequence of events during the operation of a vehicle under slow off-throttle conditions (e.g., where the accelerator is released slowly) during a regenerative braking scenario where regenerative braking is applied to slow the vehicle, but no friction braking. A horizontal (x-axis) of timing diagram 1200 denotes time and the vertical markers t1-t6 identify significant times. Timing diagram 1200 includes eight plots. A first plot, line 1202, indicates a motor speed of an electric motor of the e-axle (e.g., electric motor 301). A second plot, line 1204, indicates a motor torque of the electric motor. A third plot, line 1206, indicates a brake switch value, which may be TRUE or FALSE. A fourth plot, line 1208, indicates an accelerator pedal position of the vehicle. A fifth plot, line 1210, indicates an accelerator pedal rate of the vehicle. A sixth plot, line 1212, indicates an EWHI generated by the estimator module, as described in reference to FIG. 9. The EWHI is a percent between zero and 100. A seventh plot, line 1214, indicates a wheel-hop flag generated by the estimator module, as described in reference to FIG. 9. An eighth plot, line 1216, indicates a position of a clutch (e.g., clutch 320 of FIG. 3) that may be actuated to a neutral position to prevent the wheel-hop condition.

Prior to a time t1, the vehicle is operating under power of the electric motor, with a positive and constant APP. At time t1, the operator releases the accelerator slowly, and the APP decreases towards zero with a negative but moderate APR that does not decrease below a PCC ON APR threshold indicated by a dotted line 1211. The motor speed and motor torque both begin to decrease. At a time t2, the motor torque decreases below a PPC torque threshold, indicated by a dotted line 1205. The APP is less than a PPC ON APP threshold, indicated by a dotted line 1209. The wheel-hop flag is FALSE. As a result of the APP being less than a PPC ON APP, the threshold motor torque decreasing below the PPC torque threshold, and the wheel-hop flag being FALSE, the conditions are met for actuating the clutch to the shallow engagement indicated by a dotted line 1219, meaning, a fully engaged position (indicated by a dashed line 1217) minus a PPC clutch position offset 1220, in preparation for shift of the clutch into neutral.

Between time t2 and t3, regenerative braking is applied to further slow the vehicle, as indicated by the negative motor torque shown by line 1214. At a time t3, as the regenerative braking is applied, an oscillation of the motor speed is detected at a motor speed sensor, indicating the development of a wheel-hop condition. In response to detecting the oscillation, the EWHI calculated by the estimator module of the TCU begins to increase.

At a time t4, the EWHI increases above a set threshold indicated by a dotted line 1215. For example, the threshold may be 50%. As a result of the EWHI increasing above the set threshold, the estimator module sets the wheel-hop flag to TRUE. As a result of the wheel-hop flag being TRUE, the clutch is actuated to the neutral position, as indicated by line 1216.

Between time t4 and a time t5, the wheel-hop condition occurs, as indicated by the oscillation in the motor speed. However, at time t5, as a result of the clutch being actuated to the neutral position, the wheel-hop condition is halted, and the motor speed resumes its downward trajectory. As a result of the oscillations of the motor speed stopping, the EWHI decreases to zero.

At a time t6, the wheel-hop flag is set to FALSE. A reset of the estimator module is triggered by an estimator calibration control module of the TCU, as described above in reference to FIG. 5.

Figure 13:
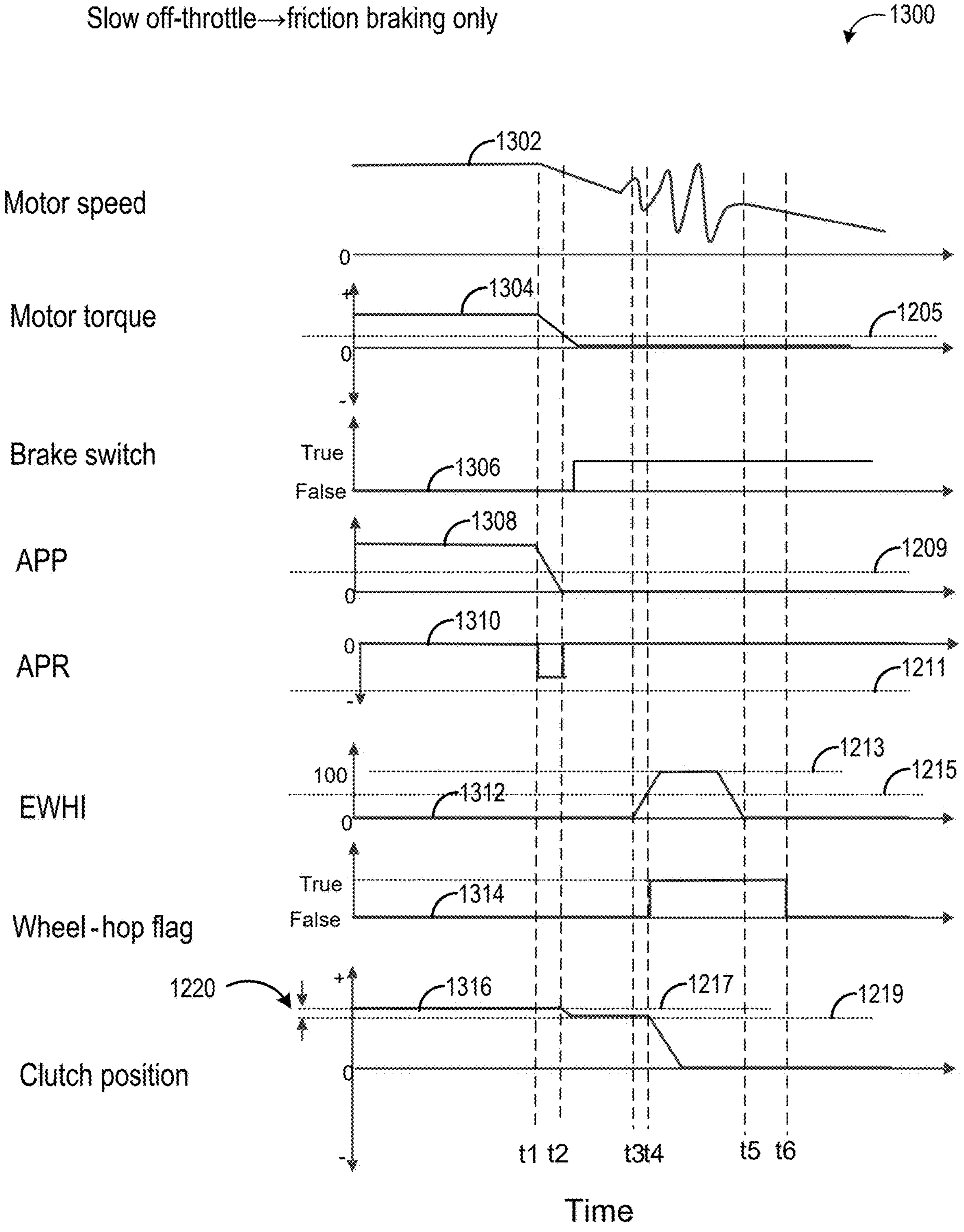
FIG. 13 is a second timing diagram illustrating a second exemplary sequence of events during operation of the vehicle under a wheel-hop condition.

FIG. 13 shows a second example timing diagram 1300 showing a second exemplary sequence of events during the operation of the vehicle under slow off-throttle conditions during a friction braking scenario where regenerative braking is not applied. A horizontal (x-axis) of timing diagram 1300 denotes time and the vertical markers t1-t6 identify significant times. Timing diagram 1300 includes similar plots as FIG. 12. A first plot, line 1302, indicates a motor speed of an electric motor of the e-axle (e.g., electric motor 301). A second plot, line 1304, indicates a motor torque of the electric motor. A third plot, line 1306, indicates a brake switch value, which may be TRUE or FALSE. A fourth plot, line 1308, indicates an accelerator pedal position of the vehicle. A fifth plot, line 1310, indicates an accelerator pedal rate of the vehicle. A sixth plot, line 1312, indicates an EWHI generated by the estimator module, as described in reference to FIG. 9. The EWHI is a percent between zero and 100. A seventh plot, line 1314, indicates a wheel-hop flag generated by the estimator module, as described in reference to FIG. 9. An eighth plot, line 1316, indicates a position of a clutch (e.g., clutch 320 of FIG. 3) that may be actuated to a neutral position to prevent the wheel-hop condition.

Prior to a time t1, the vehicle is operating under power of the electric motor, with a positive and constant APP. At time t1, the operator releases the accelerator slowly, and the APP decreases towards zero with a negative but moderate APR. The motor speed and motor torque both begin to decrease. At a time t2, the motor torque decreases below a PPC torque threshold, indicated by the dotted line 1205. The APP is less than a PPC ON APP threshold, indicated by the dotted line 1209. The wheel-hop flag is FALSE. As a result of the APP being less than a PPC ON APP, the threshold motor torque decreasing below the PPC torque threshold, and the wheel-hop flag being FALSE, the conditions are met for actuating the clutch to the shallow engagement indicated by the dotted line 1219, meaning, a fully engaged position (indicated by the dashed line 1217) minus the PPC clutch position offset 1220, in preparation for shift of the clutch into neutral.

Between time t2 and t3, friction braking is applied to slow the vehicle, and the motor torque decreases to zero. In response to the application of the brake by the driver and consequently the control signal for braking on the communication network being set to TRUE, the brake switch is set to TRUE. At a time t3, an oscillation of the motor speed is detected at a motor speed sensor, indicating the development of a wheel-hop condition. In response to detecting the oscillation, the EWHI calculated by the estimator module of the TCU begins to increase.

At a time t4, the EWHI increases above the set threshold indicated by the dotted line 1215. For example, the set threshold may be 50%. As a result of the EWHI increasing above the set threshold, the estimator module sets the wheel-hop flag to TRUE. As a result of the wheel-hop flag being TRUE, the clutch is actuated to the neutral position, as indicated by line 1316.

Between time t4 and a time t5, the wheel-hop condition occurs, as indicated by the oscillation in the motor speed. However, at time t5, as a result of the clutch being actuated to the neutral position, the wheel-hop condition is halted, and the motor speed resumes its downward trajectory. As a result of the oscillations of the motor speed stopping, the EWHI decreases to zero. At a time t6, the wheel-hop flag is set to FALSE and a reset of the estimator module is triggered by an estimator calibration control module of the TCU, as described above in reference to FIG. 5.

Figure 14:
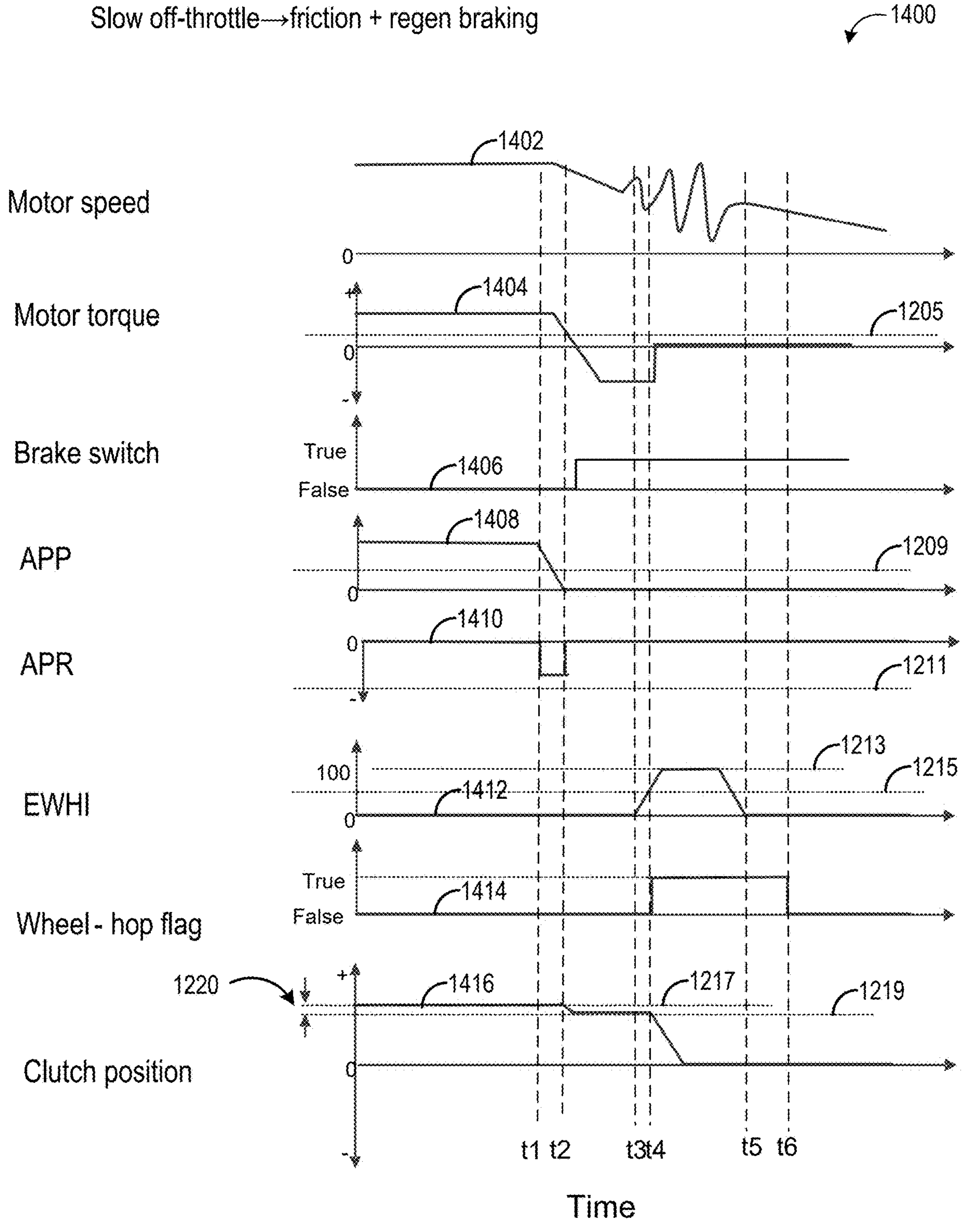
FIG. 14 is a third timing diagram illustrating a third exemplary sequence of events during operation of the vehicle under a wheel-hop condition.

FIG. 14 shows a third example timing diagram 1400 showing a third exemplary sequence of events during the operation of the vehicle under slow off-throttle conditions during a braking scenario where friction braking and regenerative braking are both used. A horizontal (x-axis) of timing diagram 1400 denotes time and the vertical markers t1-t6 identify significant times. Timing diagram 1400 includes similar plots as FIG. 12. A first plot, line 1402, indicates a motor speed of an electric motor of the e-axle (e.g., electric motor 301). A second plot, line 1404, indicates a motor torque of the electric motor. A third plot, line 1406, indicates a brake switch value, which may be TRUE or FALSE. A fourth plot, line 1408, indicates an accelerator pedal position of the vehicle. A fifth plot, line 1410, indicates an accelerator pedal rate of the vehicle. A sixth plot, line 1412, indicates an EWHI generated by the estimator module, as described in reference to FIG. 9. The EWHI is a percent between zero and 100. A seventh plot, line 1414, indicates a wheel-hop flag generated by the estimator module, as described in reference to FIG. 9. An eighth plot, line 1416, indicates a position of a clutch (e.g., clutch 320 of FIG. 3) that may be actuated to a neutral position to prevent the wheel-hop condition.

Prior to a time t1, the vehicle is operating under power of the electric motor, with a positive and constant APP. At time t1, the operator releases the accelerator slowly, and the APP decreases towards zero with a negative but moderate APR. The motor speed and motor torque both begin to decrease. At a time t2, the motor torque decreases below a PPC torque threshold, indicated by the dotted line 1205. The APP is less than a PPC ON APP threshold, indicated by the dotted line 1209. The wheel-hop flag is FALSE. As a result of the APP being less than a PPC ON APP, the threshold motor torque decreasing below the PPC torque threshold, and the wheel-hop flag being FALSE, the conditions are met for actuating the clutch to the shallow engagement indicated by the dotted line 1219, meaning, a fully engaged position (indicated by the dashed line 1217) minus the PPC clutch position offset 1220, in preparation for shift of the clutch into neutral.

Between time t2 and t3, regenerative braking is applied to further slow the vehicle, as indicated by the negative motor torque shown by line 1404. In response to the brake application by the driver and consequently the control signal for braking on the communication network being set to TRUE, the brake switch is set to TRUE, and friction braking is also applied to slow the vehicle. At a time t3, an oscillation of the motor speed is detected at a motor speed sensor, indicating the development of a wheel-hop condition. In response to detecting the oscillation, the EWHI calculated by the estimator module of the TCU begins to increase.

At a time t4, the EWHI increases above the set threshold indicated by the dotted line 1215. For example, the set threshold may be 50%. As a result of the EWHI increasing above the set threshold, the estimator module sets the wheel-hop flag to TRUE. As a result of the wheel-hop flag being TRUE, the clutch is actuated to the neutral position, as indicated by line 1416.

Between time t4 and a time t5, the wheel-hop condition occurs, as indicated by the oscillation in the motor speed. However, at time t5, as a result of the clutch being actuated to the neutral position, the wheel-hop condition is halted, and the motor speed resumes its downward trajectory. As a result of the oscillations of the motor speed stopping, the EWHI decreases to zero. At a time t6, the wheel-hop flag is set to FALSE and a reset of the estimator module is triggered by an estimator calibration control module of the TCU, as described above in reference to FIG. 5.

Figure 15:
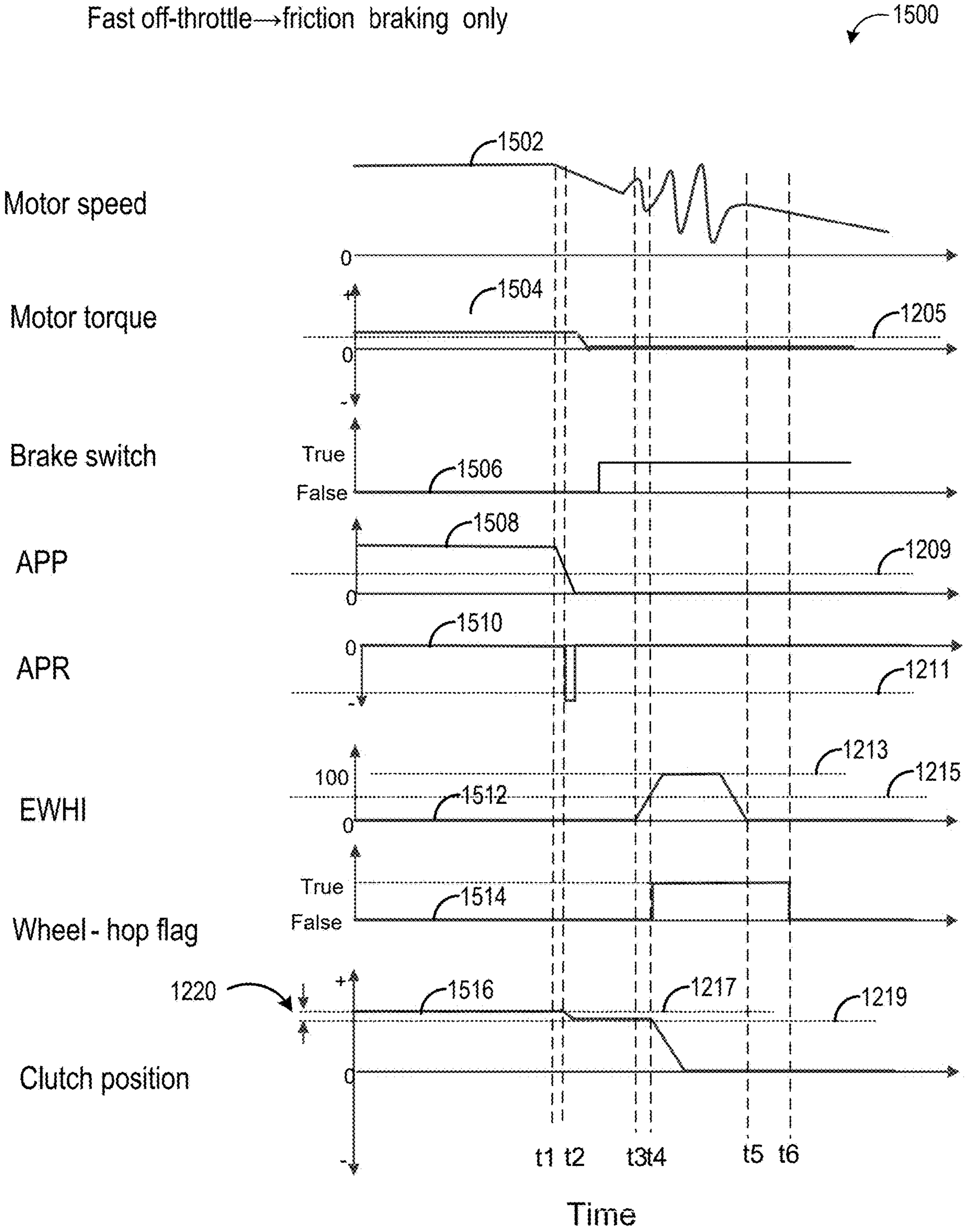
FIG. 15 is a fourth timing diagram illustrating a fourth exemplary sequence of events during operation of the vehicle under a wheel-hop condition.

FIG. 15 shows a fourth example timing diagram 1500 showing a fourth exemplary sequence of events during the operation of the vehicle under fast off-throttle conditions (e.g., where the accelerator is released rapidly) during a braking scenario where friction braking is applied and regenerative braking is not applied. A horizontal (x-axis) of timing diagram 1500 denotes time and the vertical markers t1-t6 identify significant times. Timing diagram 1500 includes similar plots as FIG. 12. A first plot, line 1502, indicates a motor speed of an electric motor of the e-axle (e.g., electric motor 301). A second plot, line 1504, indicates a motor torque of the electric motor. A third plot, line 1506, indicates a brake switch value, which may be TRUE or FALSE. A fourth plot, line 1508, indicates an accelerator pedal position of the vehicle. A fifth plot, line 1510, indicates an accelerator pedal rate of the vehicle. A sixth plot, line 1512, indicates an EWHI generated by the estimator module, as described in reference to FIG. 9. The EWHI is a percent between zero and 100. A seventh plot, line 1514, indicates a wheel-hop flag generated by the estimator module, as described in reference to FIG. 9. An eighth plot, line 1516, indicates a position of a clutch (e.g., clutch 320 of FIG. 3) that may be actuated to a neutral position to prevent the wheel-hop condition.

Prior to a time t1, the vehicle is operating under power of the electric motor, with a positive and constant APP. At time t1, the operator releases the accelerator rapidly, and the APP decreases towards zero with a negative APR (e.g., more rapidly than in FIGS. 12, 13, and 14) that decreases below the PCC ON APR threshold indicated by the dotted line 1211. The motor speed and motor torque both begin to decrease. At a time t2, the motor torque decreases below a PPC torque threshold, indicated by the dotted line 1205. The APP is less than a PPC ON APP threshold, indicated by the dotted line 1209. The wheel-hop flag is FALSE. As a result of the APR being less than the PPC ON APR threshold, the threshold motor torque decreasing below the PPC torque threshold, and the wheel-hop flag being FALSE, the conditions are met for actuating the clutch to the shallow engagement indicated by the dotted line 1219, meaning, a fully engaged position (indicated by the dashed line 1217) minus the PPC clutch position offset 1220, in preparation for shift of the clutch into neutral.

Between time t2 and t3, in response to the brake application by the driver and consequently the control signal for braking on the communication network being set to TRUE, the brake switch is set to TRUE, and friction braking is applied to slow the vehicle. At a time t3, an oscillation of the motor speed is detected at a motor speed sensor, indicating the development of a wheel-hop condition. In response to detecting the oscillation, the EWHI calculated by the estimator module of the TCU begins to increase.

At a time t4, the EWHI increases above the set threshold indicated by the dotted line 1215. As a result of the EWHI increasing above the set threshold, the estimator module sets the wheel-hop flag to TRUE. As a result of the wheel-hop flag being TRUE, the clutch is actuated to the neutral position, as indicated by line 1516.

Between time t4 and a time t5, the wheel-hop condition occurs, as indicated by the oscillation in the motor speed. However, at time t5, as a result of the clutch being actuated to the neutral position, the wheel-hop condition is halted, and the motor speed resumes its downward trajectory. As a result of the oscillations of the motor speed stopping, the EWHI decreases to zero. At a time t6, the wheel-hop flag is set to FALSE and a reset of the estimator module is triggered by an estimator calibration control module of the TCU, as described above in reference to FIG. 5.

Figure 16:
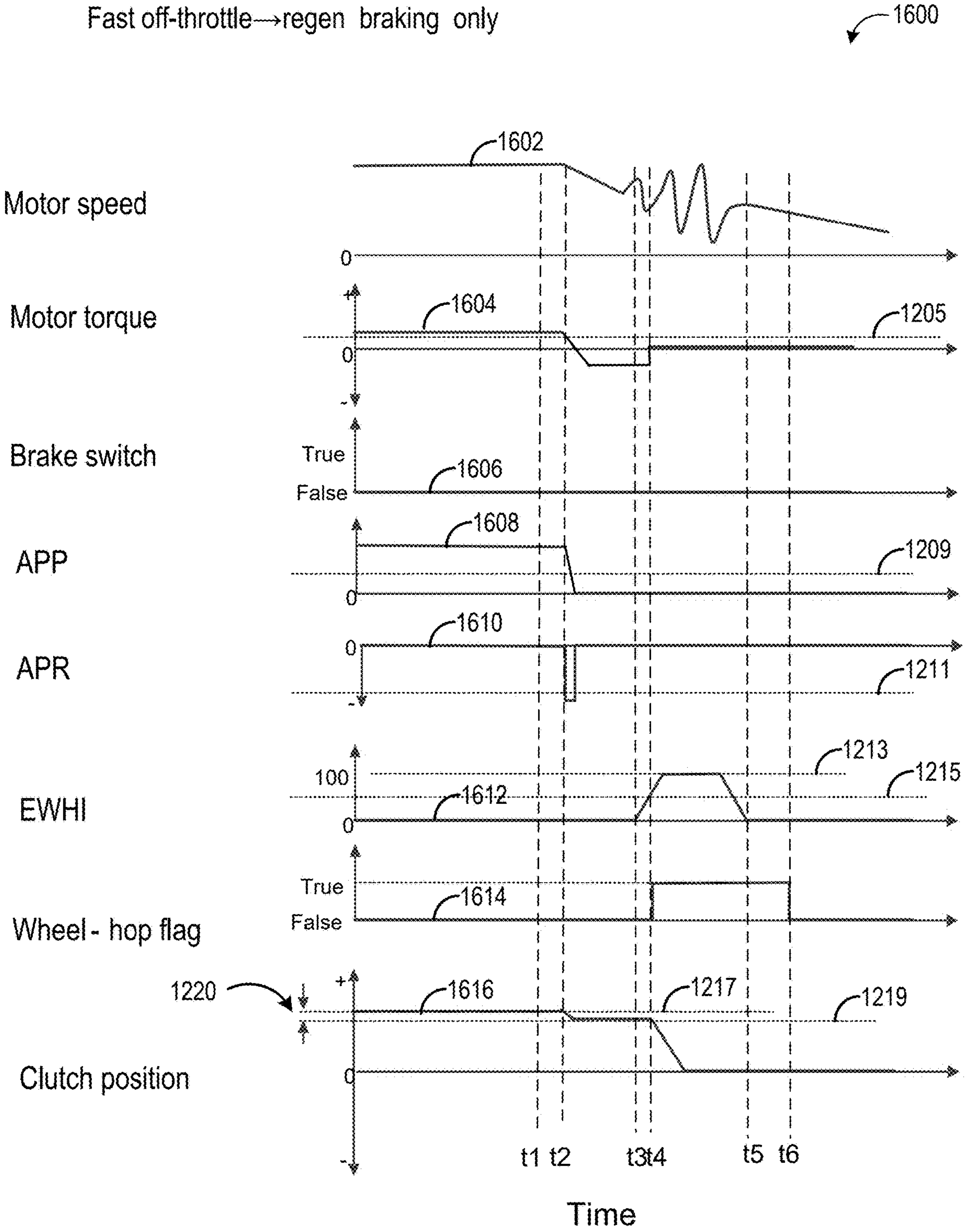
FIG. 16 is a fifth timing diagram illustrating a fifth exemplary sequence of events during operation of the vehicle under a wheel-hop condition.

FIG. 16 shows a fifth example timing diagram 1600 showing a fifth exemplary sequence of events during the operation of the vehicle under the fast off-throttle conditions during a braking scenario where regenerative braking is used, and friction braking is not used. A horizontal (x-axis) of timing diagram 1600 denotes time and the vertical markers t1-t6 identify significant times. Timing diagram 1600 includes similar plots as FIG. 12. A first plot, line 1602, indicates a motor speed of an electric motor of the e-axle (e.g., electric motor 301). A second plot, line 1604, indicates a motor torque of the electric motor. A third plot, line 1606, indicates a brake switch value, which may be TRUE or FALSE. A fourth plot, line 1608, indicates an accelerator pedal position of the vehicle. A fifth plot, line 1610, indicates an accelerator pedal rate of the vehicle. A sixth plot, line 1612, indicates an EWHI generated by the estimator module, as described in reference to FIG. 9. The EWHI is a percent between zero and 100. A seventh plot, line 1614, indicates a wheel-hop flag generated by the estimator module, as described in reference to FIG. 9. An eighth plot, line 1616, indicates a position of a clutch (e.g., clutch 320 of FIG. 3) that may be actuated to a neutral position to prevent the wheel-hop condition.

Prior to a time t1, the vehicle is operating under power of the electric motor, with a positive and constant APP. At time t1, the operator releases the accelerator rapidly, and the APP decreases rapidly towards zero with a negative APR that decreases below the PCC ON APR threshold indicated by the dotted line 1211. The motor speed and motor torque both begin to decrease. At a time t2, the motor torque decreases below a PPC torque threshold, indicated by the dotted line 1205. The APP is less than a PPC ON APP threshold, indicated by the dotted line 1209. The wheel-hop flag is FALSE. As a result of the APR being less than the PPC ON APR threshold, the threshold motor torque decreasing below the PPC torque threshold, and the wheel-hop flag being FALSE, the conditions are met for actuating the clutch to the shallow engagement indicated by the dotted line 1219, meaning, a fully engaged position (indicated by the dashed line 1217) minus the PPC clutch position offset 1220, in preparation for shift of the clutch into neutral.

Between time t2 and t3, regenerative braking is applied to further slow the vehicle, as indicated by the negative motor torque shown by line 1604. At a time t3, an oscillation of the motor speed is detected at a motor speed sensor, indicating the development of a wheel-hop condition. In response to detecting the oscillation, the EWHI calculated by the estimator module of the TCU begins to increase.

At a time t4, the EWHI increases above the set threshold indicated by the dotted line 1215. As a result of the EWHI increasing above the set threshold, the estimator module sets the wheel-hop flag to TRUE. As a result of the wheel-hop flag being TRUE, the clutch is actuated to the neutral position, as indicated by line 1616.

Between time t4 and a time t5, the wheel-hop condition occurs, as indicated by the oscillation in the motor speed. However, at time t5, as a result of the clutch being actuated to the neutral position, the wheel-hop condition is halted, and the motor speed resumes its downward trajectory. As a result of the oscillations of the motor speed stopping, the EWHI decreases to zero. At a time t6, the wheel-hop flag is set to FALSE and a reset of the estimator module is triggered by an estimator calibration control module of the TCU, as described above in reference to FIG. 5.

Figure 17:
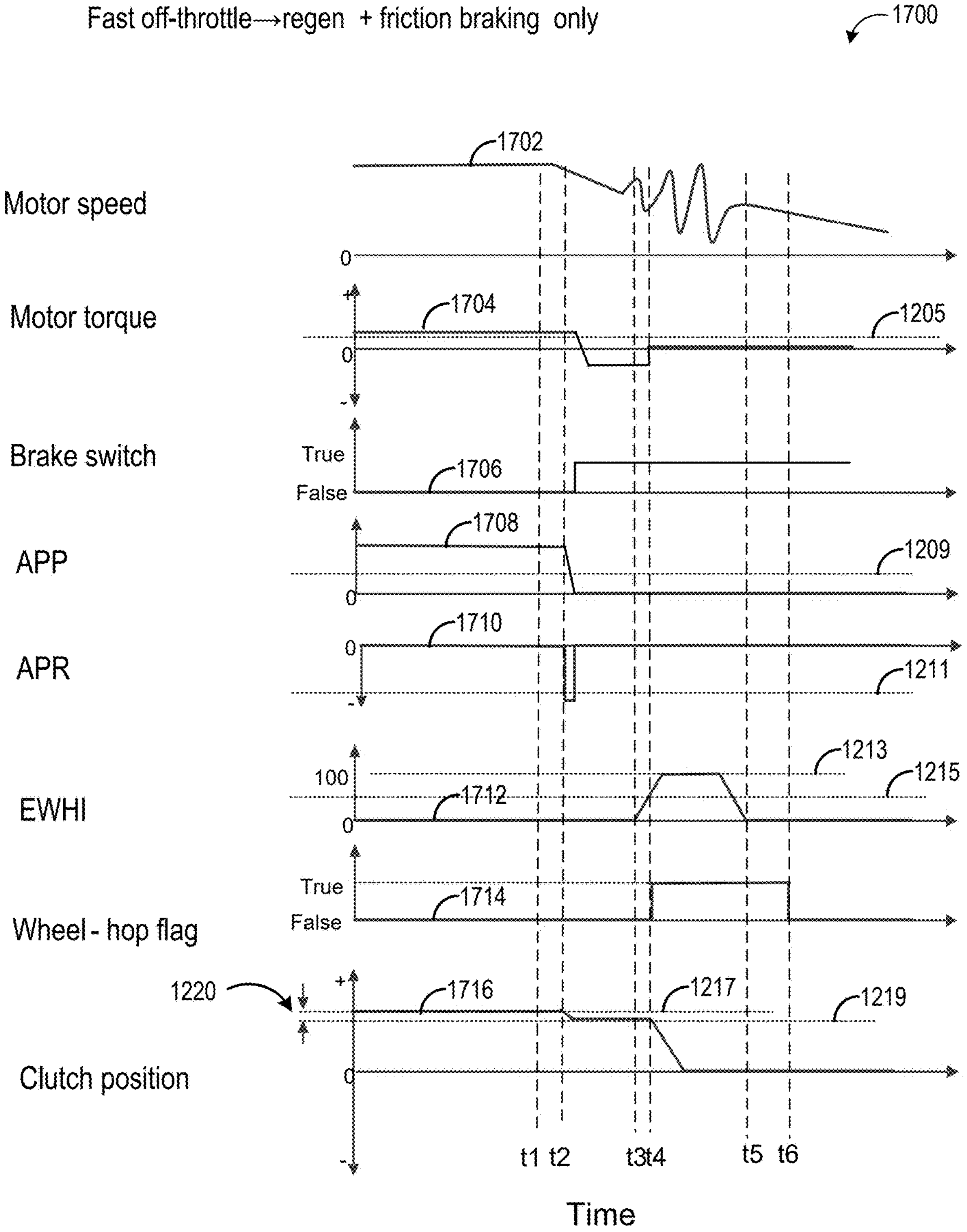
FIG. 17 is a sixth timing diagram illustrating a sixth exemplary sequence of events during operation of the vehicle under a wheel-hop condition.

FIG. 17 shows a sixth example timing diagram 1700 showing a sixth exemplary sequence of events during the operation of the vehicle under the fast off-throttle conditions during a braking scenario where friction braking and regenerative braking are both used. A horizontal (x-axis) of timing diagram 1700 denotes time and the vertical markers t1-t6 identify significant times. Timing diagram 1700 includes similar plots as FIG. 12. A first plot, line 1702, indicates a motor speed of an electric motor of the e-axle (e.g., electric motor 301). A second plot, line 1704, indicates a motor torque of the electric motor. A third plot, line 1706, indicates a brake switch value, which may be TRUE or FALSE. A fourth plot, line 1708, indicates an accelerator pedal position of the vehicle. A fifth plot, line 1710, indicates an accelerator pedal rate of the vehicle. A sixth plot, line 1712, indicates an EWHI generated by the estimator module, as described in reference to FIG. 9. The EWHI is a percent between zero and 100. A seventh plot, line 1714, indicates a wheel-hop flag generated by the estimator module, as described in reference to FIG. 9. An eighth plot, line 1716, indicates a position of a clutch (e.g., clutch 320 of FIG. 3) that may be actuated to a neutral position to prevent the wheel-hop condition.

Prior to a time t1, the vehicle is operating under power of the electric motor, with a positive and constant APP. At time t1, the operator releases the accelerator rapidly, and the APP decreases rapidly towards zero with a negative APR that decreases below the PCC ON APR threshold indicated by the dotted line 1211. The motor speed and motor torque both begin to decrease. At a time t2, the motor torque decreases below a PPC torque threshold, indicated by the dotted line 1205. The APP is less than a PPC ON APP threshold, indicated by the dotted line 1209. The wheel-hop flag is FALSE. As a result of the APR being less than the PPC ON APR threshold, the threshold motor torque decreasing below the PPC torque threshold, and the wheel-hop flag being FALSE, the conditions are met for actuating the clutch to the shallow engagement indicated by the dotted line 1219, meaning, a fully engaged position (indicated by the dashed line 1217) minus the PPC clutch position offset 1220, in preparation for shift of the clutch into neutral.

Between time t2 and t3, regenerative braking is applied to slow the vehicle, as indicated by the negative motor torque shown by line 1704. In response to the brake application by the driver and consequently the control signal for braking on the communication network being set to TRUE, the brake switch is set to TRUE, and friction braking is also applied to slow the vehicle. At a time t3, an oscillation of the motor speed is detected at a motor speed sensor, indicating the development of a wheel-hop condition. In response to detecting the oscillation, the EWHI calculated by the estimator module of the TCU begins to increase.

At a time t4, the EWHI increases above the set threshold indicated by the dotted line 1215. As a result of the EWHI increasing above the set threshold, the estimator module sets the wheel-hop flag to TRUE. As a result of the wheel-hop flag being TRUE, the clutch is actuated to the neutral position, as indicated by line 1716.

Between time t4 and a time t5, the wheel-hop condition occurs, as indicated by the oscillation in the motor speed. However, at time t5, as a result of the clutch being actuated to the neutral position, the wheel-hop condition is halted, and the motor speed resumes its downward trajectory. As a result of the oscillations of the motor speed stopping, the EWHI decreases to zero. At a time t6, the wheel-hop flag is set to FALSE and a reset of the estimator module is triggered by an estimator calibration control module of the TCU, as described above in reference to FIG. 5.

Figure 18:
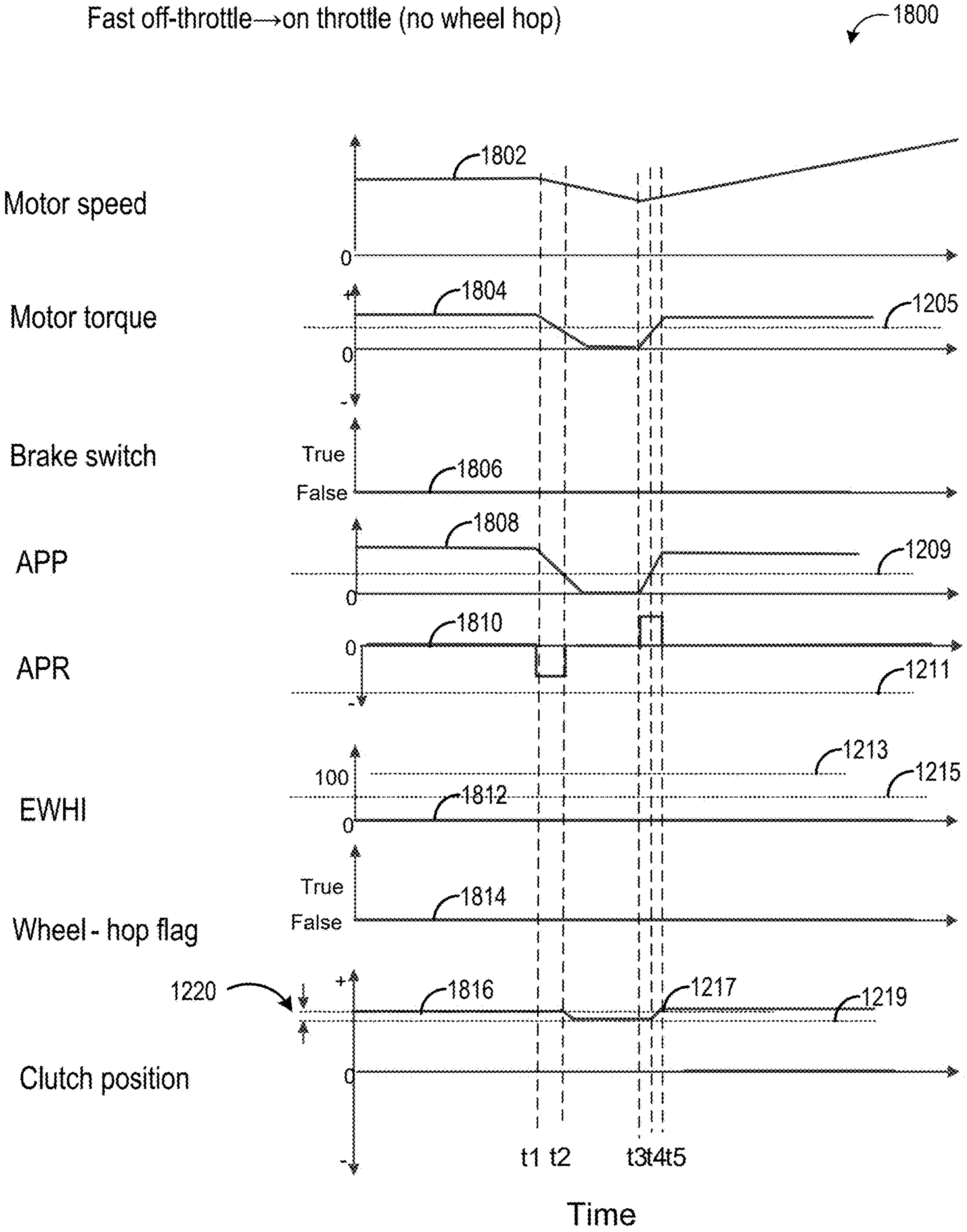
FIG. 18 is a seventh timing diagram illustrating a seventh exemplary sequence of events during operation of the vehicle when the wheel-hop condition does not occur.

FIG. 18 shows a seventh example timing diagram 1800 showing a seventh exemplary sequence of events during the operation of the vehicle under off-throttle/on-throttle conditions, where the wheel-hop condition does not occur, as a comparison with FIGS. 12-17. A horizontal (x-axis) of timing diagram 1800 denotes time and the vertical markers t1-t6 identify significant times. Timing diagram 1800 includes similar plots as FIG. 12. A first plot, line 1802, indicates a motor speed of an electric motor of the e-axle (e.g., electric motor 301). A second plot, line 1804, indicates a motor torque of the electric motor. A third plot, line 1806, indicates a brake switch value, which may be TRUE or FALSE. A fourth plot, line 1808, indicates an accelerator pedal position of the vehicle. A fifth plot, line 1810, indicates an accelerator pedal rate of the vehicle. A sixth plot, line 1812, indicates an EWHI generated by the estimator module, as described in reference to FIG. 9. The EWHI is a percent between zero and 100. A seventh plot, line 1814, indicates a wheel-hop flag generated by the estimator module, as described in reference to FIG. 9. An eighth plot, line 1816, indicates a position of a clutch (e.g., clutch 320 of FIG. 3) that may be actuated to a neutral position to prevent the wheel-hop condition.

Prior to a time t1, the vehicle is operating under power of the electric motor, with a positive and constant APP. At time t1, the operator releases the accelerator slowly, and the APP decreases towards zero with a negative but moderate APR that does not decrease below the PCC ON APR threshold indicated by the dotted line 1211. The motor speed and motor torque both begin to decrease.

At a time t2, the motor torque decreases below a PPC torque threshold, indicated by the dotted line 1205. The APP decreases below the PPC ON APP threshold, indicated by the dotted line 1209. The wheel-hop flag is FALSE. As a result of the APP crossing the PPC ON APP threshold, the threshold motor torque decreasing below the PPC torque threshold, and the wheel-hop flag being FALSE, the conditions are met for actuating the clutch to the shallow engagement indicated by the dotted line 1219, meaning, a fully engaged position (indicated by the dashed line 1217) minus the PPC clutch position offset 1220, in preparation for shift of the clutch into neutral.

Between time t2 and t3, the APP is zero and the motor torque is zero, and the motor speed continues to decrease. Brakes of the vehicle are not applied, and the brake switch remains FALSE.

At a time t3, the operator increases a pressure on the accelerator, and the APP increases rapidly with a high APR. As a result, the motor torque and the motor speed both increase.

At a time t4, the APP achieves the PCC ON APP threshold indicated by the dotted line 1209. The motor torque remains below the PPC torque threshold indicated by the dotted line 1205. No oscillations of the motor speed are detected, and the EWHI is maintained at 0. As a result of the EWHI being 0, the wheel-hop flag is maintained FALSE. In accordance with the algorithm of the pre-protection control module (e.g., pre-protection control 600 of FIG. 6), as a result of the APR being greater than or equal to the PPC OFF APR threshold AND the APP being greater than or equal to the PPC OFF APP threshold AND the motor torque being less than or equal to the PPC torque threshold AND the wheel-hop flag being FALSE, the clutch is activated to its fully engaged position, based on a selected gear.

At a time t5, the APP is maintained constant, resulting in a constant motor torque and a steadily increasing motor speed. The wheel-hop condition does not occur.

Thus, various algorithms are proposed for predicting an intensity of a wheel-hop condition in a vehicle with a suspended, multi-speed e-axle including an electric motor and a transmission, and performing a protective action to reduce or eliminate the effects of the wheel-hop condition on the transmission and other driveline components of the e-axle. The algorithms may be executed by various software control modules of a TCU of the e-axle. A first algorithm may estimate the intensity of the wheel-hop condition; a second algorithm may perform a preparatory action for the protective action, such as actuating a clutch to a first position in anticipation of the protective action; a third algorithm may perform the protective action, which may include actuating the clutch to a neutral position; and a fourth algorithm may provide calibration data based on operating conditions to increase an efficiency of the protective action. The technical effect of performing the protective action via the algorithms is that a degradation of components of the e-axle due to a high inertial torque on the components caused by an oscillation in the suspension and driveline of the e-axle system may be reduced.

The disclosure also provides support for a method for a vehicle including a suspended multi-speed e-axle, the method comprising: estimating an intensity of a wheel-hop condition of the vehicle based on oscillations in a motor speed of an electric motor of the e-axle, detecting that the estimated wheel-hop intensity (EWHI) is greater than a threshold intensity, and in response, actuating a dog clutch of a transmission of the e-axle into a neutral position to disconnect the electric motor from an output of the transmission. In a first example of the method, the dog clutch has a least amount of torque of a plurality of clutches of the vehicle. In a second example of the method, optionally including the first example, the dog clutch selectively engages one of a third gear of the transmission and a fourth gear of the transmission. In a third example of the method, optionally including one or both of the first and second examples, the method is performed at a transmission control unit (TCU) of the vehicle. In a fourth example of the method, optionally including one or more or each of the first through third examples, estimating the intensity of the wheel-hop condition of the vehicle further comprises: filtering the motor speed using a high-pass filter, adjusting the filtered motor speed based on a gain component and a decay component, accumulating adjusted filtered motor speed data at a limited integrator, calculating the EWHI based on the accumulated adjusted filtered motor speed, and in response to detecting that the EWHI is greater than the threshold intensity, setting a wheel-hop flag to TRUE. In a fifth example of the method, optionally including one or more or each of the first through fourth examples, the high-pass filter has a cutoff frequency of 7 Hz. In a sixth example of the method, optionally including one or more or each of the first through fifth examples, the method further comprises: in response to a brake switch value being TRUE AND a motor torque received from a torque sensor of the electric motor being less than or equal to a regenerative braking torque threshold: setting the gain component to a first sum of a regenerative braking gain and a friction braking gain, and setting the decay component to a second sum of a regenerative braking decay and a friction braking decay, in response to the brake switch value being FALSE OR the motor torque not being less than or equal to the regenerative braking torque threshold: in response to the motor torque being greater than the regenerative braking torque threshold: setting the gain equal to the friction braking gain, and setting the decay equal to the friction braking decay, and in response to the motor torque not being greater than the regenerative braking torque threshold: setting the gain equal to the regenerative braking gain, and setting the decay equal to the regenerative braking decay. In a seventh example of the method, optionally including one or more or each of the first through sixth examples, the method further comprises: receiving a reset indication, and in response: discarding accumulated motor speed data at the limited integrator and accumulating new motor speed data at the limited integrator, and setting the wheel-hop flag to FALSE for subsequent monitoring of the motor speed for a new wheel-hop condition. In a eighth example of the method, optionally including one or more or each of the first through seventh examples, actuating the dog clutch into the neutral position to disconnect the electric motor further comprises: actuating the dog clutch to a shallow engagement based on an accelerator pedal position (APP) of an accelerator of the vehicle, a motor torque of the electric motor, and a clutch position offset (PPC) retrieved from a memory of the TCU, prior to actuating the dog clutch into the neutral position. In a ninth example of the method, optionally including one or more or each of the first through eighth examples, actuating the dog clutch to the shallow engagement based on the APP, the motor torque, and the clutch position offset further comprises: calculating an accelerator pedal rate (APR) from the APP, detecting that a first sub-condition is met, that the APR is less than or equal to a PPC ON APR threshold OR the APP is less than a PPC ON APP threshold, detecting that a second sub-condition is met, that an absolute value of the motor torque is less than or equal to a torque threshold, detecting that a third sub-condition is met, that the wheel-hop flag is FALSE, and in response to all of the first, second, and third sub-conditions being met, actuating the clutch to a position corresponding to a fully engaged position of the clutch minus the clutch position offset. In a tenth example of the method, optionally including one or more or each of the first through ninth examples, actuating the dog clutch into the neutral position in response to the EWHI being greater than the threshold intensity further comprises: detecting that not all of the first, second, and third sub-conditions are met, and in response: detecting a fourth sub-condition that the APR is greater than or equal to a PPC OFF APR threshold, detecting a fifth sub-condition that the APP is greater than a PPC OFF APP threshold, detecting a sixth sub-condition that the absolute value of the motor torque is less than or equal to the torque threshold, detecting a seventh sub-condition that the wheel-hop flag is FALSE, and in response to all of the fourth, fifth, sixth, and seventh sub-conditions being met, actuating the clutch to the fully engaged position of the clutch.

The disclosure also provides support for a suspended multi-speed e-axle of a vehicle, the e-axle including: a transmission control unit (TCU) including a memory storing instructions that when executed, cause the TCU to: estimate an intensity of a wheel-hop condition of the vehicle based on oscillations in a motor speed of an electric motor of the e-axle, detect that the estimated wheel-hop intensity (EWHI) is greater than a threshold intensity, and in response, command a dog clutch of a transmission of the e-axle into a neutral position to disconnect the electric motor from an output of the transmission. In a first example of the system, additional instructions are stored in the memory that when executed, cause the TCU to: filter the motor speed using a high-pass filter, adjust the filtered motor speed based on a gain component and a decay component, accumulate adjusted filtered motor speed data at a limited integrator, calculate the EWHI based on the accumulated adjusted filtered motor speed, and in response to detecting that the EWHI is greater than the threshold intensity, set a wheel-hop flag to TRUE. In a second example of the system, optionally including the first example, additional instructions are stored in the memory that when executed, cause the TCU to: in response to a brake switch value being TRUE AND a motor torque received from a torque sensor of the electric motor being less than or equal to a regenerative braking torque threshold: set the gain component to a first sum of a regenerative braking gain and a friction braking gain, and set the decay component to a second sum of a regenerative braking decay and a friction braking decay, in response to the brake switch value being FALSE OR the motor torque not being less than or equal to the regenerative braking torque threshold: in response to the motor torque being greater than the regenerative braking torque threshold: set the gain equal to the friction braking gain, and set the decay equal to the friction braking decay, and in response to the motor torque not being greater than the regenerative braking torque threshold: set the gain equal to the regenerative braking gain, and set the decay equal to the regenerative braking decay. In a third example of the system, optionally including one or both of the first and second examples, additional instructions are stored in the memory that when executed, cause the TCU to: actuate the dog clutch to a shallow engagement based on an accelerator pedal position (APP) of an accelerator of the vehicle, the motor torque, and a clutch position offset (PPC) retrieved from the memory, prior to actuating the dog clutch into the neutral position. In a fourth example of the system, optionally including one or more or each of the first through third examples, additional instructions are stored in the memory that when executed, cause the TCU to: calculate an accelerator pedal rate (APR) from the APP, detect that a first sub-condition is met, that the APR is less than or equal to a PPC ON APR threshold OR the APP is less than a PPC ON APP threshold, detect that a second sub-condition is met, that an absolute value of the motor torque is less than or equal to a torque threshold, detect that a third sub-condition is met, that the wheel-hop flag is FALSE, and in response to all of the first, second, and third sub-conditions being met, actuate the dog clutch to a position corresponding to a fully engaged position of the dog clutch minus the clutch position offset. In a fifth example of the system, optionally including one or more or each of the first through fourth examples, additional instructions are stored in the memory that when executed, cause the TCU to: detect that not all of the first, second, and third sub-conditions are met, and in response: detect a fourth sub-condition that the APR is greater than or equal to a PPC OFF APR threshold, detect a fifth sub-condition that the APP is greater than a PPC OFF APP threshold, detect a sixth sub-condition that the absolute value of the motor torque is less than or equal to the torque threshold, detect a seventh sub-condition that the wheel-hop flag is FALSE, and in response to all of the fourth, fifth, sixth, and seventh sub-conditions being met, actuate the clutch to the fully engaged position of the clutch.

The disclosure also provides support for a method for a transmission control unit (TCU) of a suspended multi-speed e-axle of a vehicle, the method comprising: receiving a motor speed from a speed sensor of an electric motor of the e-axle, filtering the motor speed using a high-pass filter, adjusting the filtered motor speed based on a gain component and a decay component, the gain component including one or both of a friction braking gain and a regenerative braking gain and the decay component including one or both of a friction braking decay and a regenerative braking decay, calculating an estimated wheel-hop intensity (EWHI) based on the adjusted motor speed, detecting that conditions are met for actuating a dog clutch of a transmission of the vehicle to a shallow engagement, and in response, actuating the dog clutch to a first position, the first position a fully engaged position of the dog clutch minus a clutch position offset retrieved from a memory of the TCU, and in response to the EWHI being greater than a threshold intensity, actuating the dog clutch into a neutral position to disconnect the electric motor from an output of the transmission. In a first example of the method, calculating the EWHI based on the adjusted motor speed further comprises: accumulating adjusted filtered motor speed data at a limited integrator, [[NEED TO FILL IN]] In a second example of the method, optionally including the first example, detecting that the conditions for actuating the dog clutch to the shallow engagement further comprises: receiving an accelerator pedal position (APP) of an accelerator of the vehicle from an APP sensor, calculating an accelerator pedal rate (APR) from the APP, receiving a motor torque of the electric motor from a torque sensor, detecting that a first sub-condition is met, that the APR is less than or equal to a PPC ON APR threshold OR the APP is less than a PPC ON APP threshold, detecting that a second sub-condition is met, that an absolute value of the motor torque is less than or equal to a torque threshold, and detecting that a third sub-condition is met, that the EWHI is not greater than the threshold intensity.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of prime movers, internal combustion engines, and/or transmissions. The subject matter of the present disclosure includes all novel and non-obvious combinations and sub-combinations of the various systems and configurations, and other features, functions, and/or properties disclosed herein.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle including a suspended multi-speed e-axle, the method comprising:
- estimating an intensity of a wheel-hop condition of the vehicle based on oscillations in a motor speed of an electric motor of the e-axle;
- detecting that the estimated wheel-hop intensity (EWHI) is greater than a threshold intensity, and in response, actuating a dog clutch of a transmission of the e-axle into a neutral position to disconnect the electric motor from an output of the transmission,
- wherein the method is performed at a transmission control unit (TCU) of the vehicle, and
- wherein estimating the intensity of the wheel-hop condition of the vehicle further comprises:
- filtering the motor speed using a high-pass filter;
- adjusting the filtered motor speed based on a gain component and a decay component;
- accumulating adjusted filtered motor speed data at a limited integrator;
- calculating the EWHI based on the accumulated adjusted filtered motor speed; and
- in response to detecting that the EWHI is greater than the threshold intensity, setting a wheel-hop flag to TRUE.

2. The method of claim 1, wherein the dog clutch has a least amount of torque of a plurality of clutches of the vehicle.

3. The method of claim 2, wherein the dog clutch selectively engages one of a third gear of the transmission and a fourth gear of the transmission.

4. The method of claim 1, wherein the high-pass filter has a cutoff frequency of 7 Hz.

5. The method of claim 1, further comprising:

in response to a brake switch value being TRUE AND a motor torque received from a torque sensor of the electric motor being less than or equal to a regenerative braking torque threshold:

setting the gain component to a first sum of a regenerative braking gain and a friction braking gain; and setting the decay component to a second sum of a regenerative braking decay and a friction braking decay;

in response to the brake switch value being FALSE OR the motor torque not being less than or equal to the regenerative braking torque threshold:

in response to the motor torque being greater than the regenerative braking torque threshold:

setting the gain equal to the friction braking gain; and setting the decay equal to the friction braking decay; and in response to the motor torque not being greater than the regenerative braking torque threshold:

setting the gain equal to the regenerative braking gain; and setting the decay equal to the regenerative braking decay.

6. The method of claim 1, further comprising:

receiving a reset indication, and in response:

discarding accumulated motor speed data at the limited integrator and accumulating new motor speed data at the limited integrator; and setting the wheel-hop flag to FALSE for subsequent monitoring of the motor speed for a new wheel-hop condition.

7. The method of claim 1, wherein actuating the dog clutch into the neutral position to disconnect the electric motor further comprises:

actuating the dog clutch to a shallow engagement based on an accelerator pedal position (APP) of an accelerator of the vehicle, a motor torque of the electric motor, and a clutch position offset (PPC) retrieved from a memory of the TCU, prior to actuating the dog clutch into the neutral position.

8. The method of claim 7, wherein actuating the dog clutch to the shallow engagement based on the APP, the motor torque, and the clutch position offset further comprises:

calculating an accelerator pedal rate (APR) from the APP;

detecting that a first sub-condition is met, that the APR is less than or equal to a PPC ON APR threshold OR the APP is less than a PPC ON APP threshold;

detecting that a second sub-condition is met, that an absolute value of the motor torque is less than or equal to a torque threshold;

detecting that a third sub-condition is met, that the wheel-hop flag is FALSE; and in response to all of the first, second, and third sub-conditions being met, actuating the clutch to a position corresponding to a fully engaged position of the clutch minus the clutch position offset.

9. The method of claim 8, wherein actuating the dog clutch into the neutral position in response to the EWHI being greater than the threshold intensity further comprises:

detecting that not all of the first, second, and third sub-conditions are met, and in response:

detecting a fourth sub-condition that the APR is greater than or equal to a PPC OFF APR threshold;

detecting a fifth sub-condition that the APP is greater than a PPC OFF APP threshold;

detecting a sixth sub-condition that the absolute value of the motor torque is less than or equal to the torque threshold;

detecting a seventh sub-condition that the wheel-hop flag is FALSE; and in response to all of the fourth, fifth, sixth, and seventh sub-conditions being met, actuating the clutch to the fully engaged position of the clutch.

10. A suspended multi-speed e-axle of a vehicle, the e-axle including:

a transmission control unit (TCU) including a memory storing instructions that when executed, cause the TCU to:

estimate an intensity of a wheel-hop condition of the vehicle based on oscillations in a motor speed of an electric motor of the e-axle;

detect that the estimated wheel-hop intensity (EWHI) is greater than a threshold intensity, and in response, command a dog clutch of a transmission of the e-axle into a neutral position to disconnect the electric motor from an output of the transmission, wherein estimating the intensity of the wheel-hop condition of the vehicle further comprises:

filtering the motor speed using a high-pass filter;

adjusting the filtered motor speed based on a gain component and a decay component;

accumulating adjusted filtered motor speed data at a limited integrator;

calculating the EWHI based on the accumulated adjusted filtered motor speed; and in response to detecting that the EWHI is greater than the threshold intensity, setting a wheel-hop flag to TRUE.

11. The suspended multi-speed e-axle of claim 10, wherein additional instructions are stored in the memory that when executed, cause the TCU to:

in response to a brake switch value being TRUE AND a motor torque received from a torque sensor of the electric motor being less than or equal to a regenerative braking torque threshold:

set the gain component to a first sum of a regenerative braking gain and a friction braking gain; and set the decay component to a second sum of a regenerative braking decay and a friction braking decay;

in response to the brake switch value being FALSE OR the motor torque not being less than or equal to the regenerative braking torque threshold:

in response to the motor torque being greater than the regenerative braking torque threshold:

set the gain equal to the friction braking gain; and set the decay equal to the friction braking decay; and in response to the motor torque not being greater than the regenerative braking torque threshold:

set the gain equal to the regenerative braking gain; and set the decay equal to the regenerative braking decay.

12. The suspended multi-speed e-axle of claim 11, wherein additional instructions are stored in the memory that when executed, cause the TCU to:

actuate the dog clutch to a shallow engagement based on an accelerator pedal position (APP) of an accelerator of the vehicle, the motor torque, and a clutch position offset (PPC) retrieved from the memory, prior to actuating the dog clutch into the neutral position.

13. The suspended multi-speed e-axle of claim 12, wherein additional instructions are stored in the memory that when executed, cause the TCU to:

calculate an accelerator pedal rate (APR) from the APP;

detect that a first sub-condition is met, that the APR is less than or equal to a PPC ON APR threshold OR the APP is less than a PPC ON APP threshold;

detect that a second sub-condition is met, that an absolute value of the motor torque is less than or equal to a torque threshold;

detect that a third sub-condition is met, that the wheel-hop flag is FALSE; and in response to all of the first, second, and third sub-conditions being met, actuate the dog clutch to a position corresponding to a fully engaged position of the dog clutch minus the clutch position offset.

14. The suspended multi-speed e-axle of claim 13, wherein additional instructions are stored in the memory that when executed, cause the TCU to:

detect that not all of the first, second, and third sub-conditions are met, and in response:

detect a fourth sub-condition that the APR is greater than or equal to a PPC OFF APR threshold;

detect a fifth sub-condition that the APP is greater than a PPC OFF APP threshold;

detect a sixth sub-condition that the absolute value of the motor torque is less than or equal to the torque threshold;

detect a seventh sub-condition that the wheel-hop flag is FALSE; and in response to all of the fourth, fifth, sixth, and seventh sub-conditions being met, actuate the clutch to the fully engaged position of the clutch.

15. A method for a transmission control unit (TCU) of a suspended multi-speed e-axle of a vehicle, the method comprising:

receiving a motor speed from a speed sensor of an electric motor of the e-axle;

filtering the motor speed using a high-pass filter;

adjusting the filtered motor speed based on a gain component and a decay component, the gain component including one or both of a friction braking gain and a regenerative braking gain and the decay component including one or both of a friction braking decay and a regenerative braking decay;

calculating an estimated wheel-hop intensity (EWHI) based on the adjusted motor speed;

detecting that conditions are met for actuating a dog clutch of a transmission of the vehicle to a shallow engagement, and in response, actuating the dog clutch to a first position, the first position a fully engaged position of the dog clutch minus a clutch position offset retrieved from a memory of the TCU; and in response to the EWHI being greater than a threshold intensity, actuating the dog clutch into a neutral position to disconnect the electric motor from an output of the transmission.

16. The method of claim 15, wherein calculating the EWHI based on the adjusted motor speed further comprises:

accumulating adjusted filtered motor speed data at a limited integrator; and performing a time domain integration of the adjusted filtered motor speed data.

17. The method of claim 15, wherein detecting that the conditions for actuating the dog clutch to the shallow engagement further comprises:

receiving an accelerator pedal position (APP) of an accelerator of the vehicle from an APP sensor;

calculating an accelerator pedal rate (APR) from the APP;

receiving a motor torque of the electric motor from a torque sensor;

detecting that a first sub-condition is met, that the APR is less than or equal to a PPC ON APR threshold OR the APP is less than a PPC ON APP threshold;

detecting that a second sub-condition is met, that an absolute value of the motor torque is less than or equal to a torque threshold; and detecting that a third sub-condition is met, that the EWHI is not greater than the threshold intensity.

* * * * *